US012801935B2

(12) United States Patent
Guo et al.

(10) Patent No.: US 12,801,935 B2
(45) Date of Patent: Nov. 17, 2026

(54) DATA PROCESSING METHOD AND APPARATUS FOR FEDERATED LEARNING SYSTEM, COMPUTER, AND READABLE STORAGE MEDIUM

(71) Applicant: TENCENT TECHNOLOGY (SHENZHEN) COMPANY LIMITED, Shenzhen (CN)

(72) Inventors: Qingyu Guo, Shenzhen (CN); Lijun Lan, Shenzhen (CN); Chao Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 376 days.

(21) Appl. No.: 18/674,514

(22) Filed: May 24, 2024

(65) Prior Publication Data

US 2024/0311649 A1 Sep. 19, 2024

Related U.S. Application Data

(63) Continuation of application No. PCT/CN2023/114152, filed on Aug. 22, 2023.

(30) Foreign Application Priority Data

Sep. 20, 2022 (CN) ......................... 202211145363.5

(51) Int. Cl.
*G06N 3/098* (2023.01)

(52) U.S. Cl.
CPC .................................... *G06N 3/098* (2023.01)

(58) Field of Classification Search
CPC ...................................................... G06N 3/098
(Continued)

(56) References Cited

U.S. PATENT DOCUMENTS 9,846,836 B2 * 12/2017 Gao .................... G06F 16/9032
2012/0284212 A1 * 11/2012 Lin ........................ G06N 20/00
706/12

(Continued)

FOREIGN PATENT DOCUMENTS

CN 111310938 A 6/2020
CN 113947211 A 1/2022

(Continued)

OTHER PUBLICATIONS

The World Intellectual Property Organization (WIPO) International Search Report for PCT/CN2023/114152 Oct. 20, 2023 7 Pages (including translation).

*Primary Examiner* — Muluemebet Gurmu
(74) *Attorney, Agent, or Firm* — ANOVA LAW GROUP, PLLC

(57) ABSTRACT

A data processing method including obtaining a server side training sample corresponding to a client side training sample of a first participation device from one or more candidate samples of a second participation device, calling a distance detection model to predict one or more sample distances each between one candidate sample and the server side training sample, obtaining a similar training sample from the one or more candidate samples based on the one or more sample distances, training an auxiliary model of the second participation device using the server side training sample and the similar training sample, to obtain a trained auxiliary model, and transmitting intermediate data generated during training of the auxiliary model to the first participation device, to enable the first participation device to train a model of the first participation device based on the client side training sample and the intermediate data, to obtain a trained model.

20 Claims, 10 Drawing Sheets

(58) Field of Classification Search
USPC .............................................................. 706/21
See application file for complete search history.

(56) References Cited

U.S. PATENT DOCUMENTS

| | | | | |
|---|---|---|---|---|
| 2014/0244191 | A1* | 8/2014 | Oka | G01R 21/133<br>702/61 |
| 2021/0097407 | A1* | 4/2021 | Pan | G06N 20/00 |

FOREIGN PATENT DOCUMENTS

| | | | |
|---|---|---|---|
| CN | 114912623 | A | 8/2022 |
| CN | 115018019 | A | 9/2022 |
| WO | 2021184836 | A1 | 9/2021 |

* cited by examiner

DATA PROCESSING METHOD AND APPARATUS FOR FEDERATED LEARNING SYSTEM, COMPUTER, AND READABLE STORAGE MEDIUM

CROSS-REFERENCE TO RELATED APPLICATIONS

This application is a continuation of International Application No. PCT/CN2023/114152, filed on Aug. 22, 2023, which claims priority to Chinese patent application No. 202211145363.5, filed with the China National Intellectual Property Administration on Sep. 20, 2022 and entitled "FEDERATED LEARNING METHOD AND APPARATUS, COMPUTER, AND READABLE STORAGE MEDIUM," the entire contents of both of which are incorporated herein by reference.

FIELD OF THE TECHNOLOGY

This application relates to the field of computer technologies, and in particular, to a data processing method and apparatus for a federated learning system, a computer, and a readable storage medium.

BACKGROUND OF THE DISCLOSURE

With the development of the Internet, artificial intelligence (AI) has gradually entered all aspects of people's lives. Training of AI needs a large amount of high-quality data. However, for protection of data, free flow of data under the premise of security and compliance has become a general trend, and data in different individual objects (such as individual users) or group objects (such as enterprises, departments, or institutions) often appears in the form of an island. In other words, data owned by different individual objects, group objects, and the like is independent of each other. Since the foregoing data is not allowed to exchange rudely and unwilling to contribute value, a large number of problems of data silos and data protection now exist, and federated learning has become an important technology. Federated learning is essentially a distributed machine learning technology with the purpose of implementing joint modeling by using data capabilities of all parties and improving an effect of a machine learning model while ensuring data security and compliance. Currently, in general, a plurality of devices jointly train the same model and exchange features generated during the model training, to implement learning of the model.

SUMMARY

In accordance with the disclosure, there is provided a data processing method including obtaining a server side training sample corresponding to a client side training sample of a first participation device of a federated learning system from one or more candidate samples of a second participation device of the federated learning system. The client side training sample has a first sample feature, and the server side training sample has a second sample feature. The method further includes calling a distance detection model to predict one or more sample distances each between one of the one or more candidate samples and the server side training sample and representing a distribution similarity between the one of the one or more candidate samples and the server side training sample, obtaining a similar training sample from the one or more candidate samples based on the one or more sample distances, training an auxiliary model of the second participation device using the server side training sample and the similar training sample, to obtain a trained auxiliary model, transmitting intermediate data generated during training of the auxiliary model to the first participation device, to enable the first participation device to train a model of the first participation device based on the client side training sample and the intermediate data, to obtain a trained model and to perform prediction on target data based on the trained model to obtain a first prediction result, predicting, in response to receiving a data detection request for the target data transmitted by the first participation device, a second prediction result of associated data associated with the target data based on the trained auxiliary model, and transmitting the second prediction result to the first participation device, to enable the first participation device to determine a target detection result of the target data based on the second prediction result and the first prediction result.

Also in accordance with the disclosure, there is provided a computer device including one or more processors, and one or more memories storing one or more instructions that, when executed by the one or more processors, cause the computer device to obtain a server side training sample corresponding to a client side training sample of a first participation device of a federated learning system from one or more candidate samples of a second participation device of the federated learning system. The client side training sample has a first sample feature, and the server side training sample has a second sample feature. The one or more instructions further cause the computer device to call a distance detection model to predict one or more sample distances each between one of the one or more candidate samples and the server side training sample that represents a distribution similarity between the one of the one or more candidate samples and the server side training sample, obtain a similar training sample from the one or more candidate samples based on the one or more sample distances, train an auxiliary model of the second participation device using the server side training sample and the similar training sample, to obtain a trained auxiliary model, transmit intermediate data generated during training of the auxiliary model to the first participation device, to enable the first participation device to train a model of the first participation device based on the client side training sample and the intermediate data, to obtain a trained model and to perform prediction on target data based on the trained model to obtain a first prediction result, predict, in response to the second participation device receiving a data detection request for the target data transmitted by the first participation device, a second prediction result of associated data associated with the target data, and transmit the second prediction result to the first participation device, to enable the first participation device to determine a target detection result of the target data based on the second prediction result and the first prediction result.

Also in accordance with the disclosure, there is provided a data processing method including obtaining a client side training sample of a first participation device of a federated learning system, receiving intermediate data generated during training of an auxiliary model of a second participation device of the federated learning system and transmitted by the second participation device, training a model of the first participation device based on the client side training sample and the intermediate data, to obtain a trained model, predicting a first prediction result of target data based on the trained model, obtaining a second prediction result of associated data of the target data transmitted by the second participation device, and obtaining a target detection result of the target data based on the first prediction result and the second prediction result. The auxiliary model is trained by the second participation device using a server side training sample and a similar training sample, the server side training sample is obtained by the second participation device based on the client side training sample, and the similar training sample is obtained from one or more candidate samples by the second participation device based on one or more sample distances each between one of the one or more candidate samples and the server side training sample.

DESCRIPTION OF EMBODIMENTS

Figure 1:
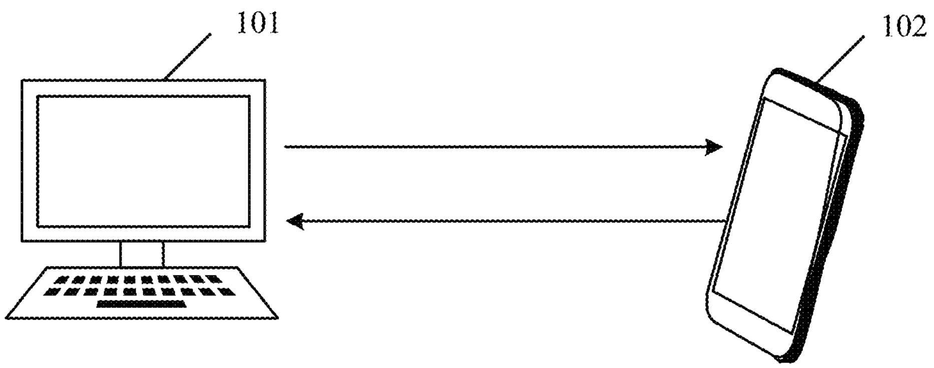
FIG. 1 is an architecture diagram showing network interaction of a federated learning system according to an embodiment of this application.

Technical solutions in embodiments of this application are clearly described below with reference to accompanying drawings in the embodiments of this application. Apparently, the described embodiments are merely some rather than all of the embodiments of this application. All other embodiments obtained by a person of ordinary skill in the art based on the embodiments of this application without creative efforts fall within the protection scope of this application.

If object data (such as user data) needs to be collected in this application, a prompt interface or a pop-up window is displayed before or during the collection. The prompt interface or the pop-up window is configured to prompt a user that XXXX data is currently being collected. Only after a confirm operation performed by the user on the prompt interface or the pop-up window is obtained, relevant operations of data obtaining start to be performed. Otherwise, the operation is ended. Moreover, the obtained user data is used in a reasonable and legal scenario, application, or the like. In some embodiments, in some scenarios where the user data needs to be used but is not authorized by the user, authorization may also be requested from the user, and when the authorization is obtained, the user data is used again.

The AI technology is a comprehensive discipline, involving a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include major directions such as a computer vision technology, a speech processing technology, a natural language processing technology, machine learning/deep learning, autonomous driving, and intelligent traffic.

In some federated learning methods, a plurality of devices jointly train the same model and exchange features generated during the model training, to implement learning of the model. However, in this manner, a modeling party may lack sufficient labeled modeling samples in some application scenarios, which leads to overfitting of the model.

Therefore, this application provides a data processing method for a federated learning system. The federated learning system includes a first participation device and a second participation device. The first participation device has a client side training sample. The second participation device has candidate samples.

In an embodiment of this application, a server side training sample corresponding to the client side training sample may be obtained from the candidate samples based on the client side training sample corresponding to the first participation device. A sample distance between each of the candidate samples and the server side training sample is obtained, and similar training samples are obtained from the candidate samples based on the sample distance. An auxiliary model of the second participation device is trained by using the server side training sample and the similar training samples to obtain a trained auxiliary model, and intermediate data generated during the training of the auxiliary model is transmitted to the first participation device, so that the first participation device trains a first model of the first participation device based on the client side training sample and the intermediate data, to obtain a trained first model. The trained first model of the first participation device and the trained auxiliary model of the second participation device are configured to jointly predict to-be-processed data (also referred to as "target data"), to obtain a target detection result corresponding to the to-be-processed data. Through the foregoing process, the second participation device and the first participation device jointly implement federated learning, so that the server side training sample corresponding to the client side training sample of the first participation device may be directly obtained. The first participation device may be considered as a modeling party (a guest side). In the manner, a sample configured for joint training with the first participation device is obtained. In addition, the similar training samples may be obtained based on the sample distance, to expand a sample quantity and perform sample enhancement. In this way, sufficient samples may be provided for model training, overfitting of a model obtained through federated learning may be reduced, and generalization of the model may be improved. However, since the similar training samples are obtained based on the sample distance from the server side training sample, the similar training samples may be adapted to a business need scenario corresponding to the client side training sample, thereby improving performance of the model obtained through the federated learning.

Some terms in this application are described below.

Model overfitting: Due to fewer samples, a model has a good data representation in a training set, but has a poor data representation in a test set, i.e., has an insufficient generalization capability.

Modeling party (guest side): It may also be referred to as a data utilization party, and generally refers to a labeled-party node (which may also have a feature) in a federated learning system.

Data provider (host side): It generally refers to a feature provider node in a federated learning system.

Private set intersection (PSI): It refers to computation of a common part (intersection) of samples of different federated participants by performing inner join alignment on the samples in a safe and private data-protected manner.

In this embodiment of this application, FIG. 1 is an architecture diagram showing network interaction of a federated learning system according to an embodiment of this application. As shown in FIG. 1, a first participation device 101 and a second participation device 102 may train a combined model through federated learning. Data detection may be performed by using the combined model. The combined model may be any functional model, for example, an image recognition model, a text recognition model, an image inpainting model, or a speech denoising model. In other words, the combined model may be a model that implements any function. In some embodiments, the first participation device 101 may be considered as a modeling party (a guest side). The second participation device 102 may be considered as a data provider (a host side). One or more second participation devices 102 may be provided. The first participation device 101 includes a client side training sample configured for performing model training in a target business need scenario. The client side training sample includes a first sample feature. The second participation devices 102 may obtain a server side training sample corresponding to the client side training sample based on the client side training sample. The server side training sample may be considered as a second feature h of the client side training sample in the second participation device (the host side), and the first sample feature may be considered as a first feature g of the client side training sample in the first participation device (the guest side). For example, if an identifier of the client side training sample is "Zhang San," the first participation device 101 may include first sample features corresponding to the client side training sample, for example, a user name of "Zhang San," age information of "20 years old," and educational information of "First University," and the second participation device 102 may include second sample features corresponding to the client side training sample, for example, the user name of "Zhang San," a work status of "working in a private enterprise," and position information of "employee."

Figure 2:
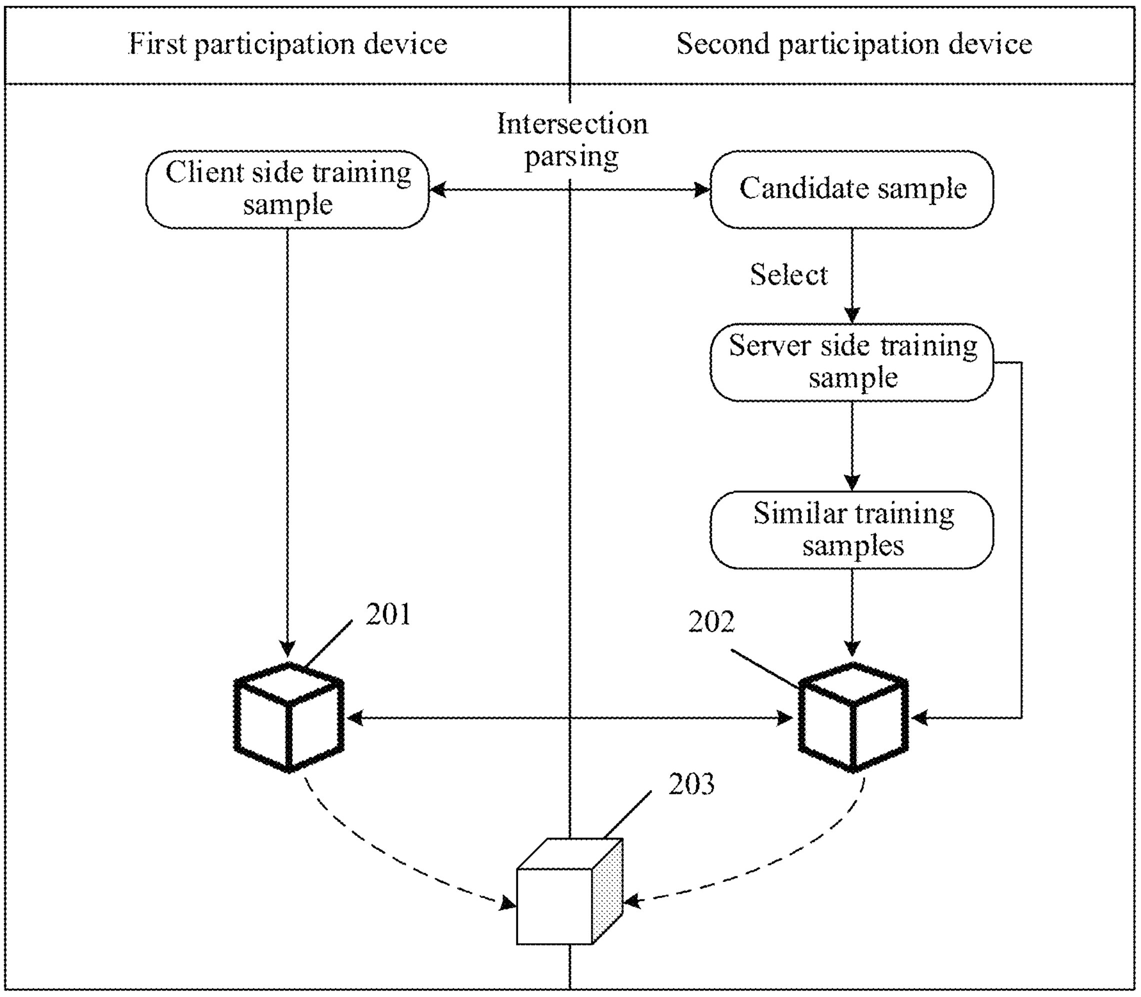
FIG. 2 is a schematic diagram showing a federated learning scenario according to an embodiment of this application.

Specifically, FIG. 2 is a schematic diagram showing a federated learning scenario according to an embodiment of this application. As shown in FIG. 2, a first participation device may obtain a client side training sample configured for training a first model 201 of the first participation device, which may specifically obtain a first sample feature associated with the client side training sample in the first participation device. A second participation device may obtain a server side training sample corresponding to the client side training sample from local candidate samples, i.e., obtain a second sample feature associated with the first sample feature. The first sample feature and the second sample feature are equivalent to different sample features of the client side training sample. Specifically, the second participation device may perform intersection parsing on candidate samples and the client side training sample, to obtain the server side training sample. The candidate samples may be considered as a library of all samples in the second participation device. Further, the second participation device may obtain a sample distance between each of the candidate samples and the server side training sample (the second sample feature), and obtain similar training samples from the candidate samples based on the sample distances, so that the obtained similar training samples are similar to the server side training sample (or the second sample feature). To be specific, the similar training samples may be used in a target business need scenario to which the first model 201 is applied, thereby ensuring that an increased training sample is applicable to the target business need scenario based on an increased sample quantity, reducing overfitting of a model obtained through federated learning, and improving model performance and generalization.

Further, the second participation device may perform parameter adjustment on an auxiliary model 202 of the second participation device through the second sample feature and the similar training samples of the server side training sample, to obtain a trained auxiliary model. The auxiliary model 202 includes a second model and a parsing model, and is configured to generate a first sample feature (a virtual generation feature) of a first participation device side (a guest side) corresponding to the similar training samples, and transmit the first sample feature to the first participation device, so that a labeled sample of the second participation device (a host side) can adaptively generate a feature of the guest side of a corresponding part, thereby ensuring that the guest side has the virtual generation feature aligned with the sample of the host side, and achieving the purpose of feature enhancement. The second participation device may perform parameter adjustment on the parsing model through the server side training sample, and perform parameter adjustment on the second model through the server side training sample and the similar training samples, to obtain a trained second model and a trained parsing model. The trained auxiliary model includes the trained second model and the trained parsing model. In some embodiments, the second participation device may transmit second intermediate data generated during the parameter adjustment of the auxiliary model to the first participation device. In some embodiments, during the parameter adjustment performed on the auxiliary model 202, the second participation device may perform the parameter adjustment on the auxiliary model 202 based on the server side training sample, the similar training samples, and first intermediate data generated during parameter adjustment of the first model 201 by the first participation device. The first participation device may perform parameter adjustment on the first model 201 by using the client side training sample, to obtain a trained first model. The first model 201 is configured to map the first sample features of the client side training sample and then exchange encrypted intermediate results with the second model 202. The first model and the second model interact with each other for adversarial training, and finally form a convergent first model and a convergent second model, which are collectively referred to as a combined model. In some embodiments, the first participation device may transmit the first intermediate data generated during the parameter adjustment of the first model 201 to the second participation device. Through federated learning of the first participation device and the second participation device, when data of the first participation device and the second participation device remains independent, a first model and a second model that are finally needed are obtained through training, and therefore a combined model 203 is obtained. The combined model 203 may be considered as a virtual model, i.e., a conceptual model, which is configured to represent that the first model and the second model may jointly detect to-be-processed data. The combined model 203 may also be an actual model. For example, the combined model 203 may be constructed by using the first model and the second model. In this way, reliability and security of data of each participation device are ensured, sample enhancement is implemented, and performance, accuracy, and generalization of a model obtained through training are improved.

The first participation device or the second participation device mentioned in this embodiment of this application may be a computer device. The computer device in the embodiments of this application includes but is not limited to a terminal device or a server. In other words, the computer device may be a server or a terminal device, or may be a system composed of the server and the terminal device. The terminal device mentioned above may be an electronic device, which includes but is not limited to a mobile phone, a tablet computer, a desktop computer, a notebook computer, a handheld computer, an on-board device, an augmented reality/virtual reality (AR/VR) device, a helmet display, a smart television, a wearable device, a smart speaker, a digital camera, a camera, and another mobile Internet device (MID) with a network access capability, or a terminal device in a scenario such as a train, a ship, and an aircraft. The server mentioned above may be an independent physical server, or may be a server cluster formed by a plurality of physical servers or a distributed system, and may also be a cloud server providing basic cloud computing services such as a cloud service, a cloud database, cloud computing, a cloud function, cloud storage, a network service, cloud communication, a middleware service, a domain name service, a security service, vehicle infrastructure cooperation, a content delivery network (CDN), and a big data and artificial intelligence platform.

In some embodiments, the data involved in the embodiments of this application may be stored in a computer device, or may be stored based on a cloud storage technology or a blockchain network, which is not limited herein. For example, the client side training sample of the first participation device may be stored in an internal memory space of the first participation device, may be stored through the cloud storage technology, or may be stored in the blockchain network, which is not limited herein. In some embodiments, the data of the participation devices may be considered as independent of each other. For example, the first participation device cannot directly obtain the server side training sample and the similar training samples of the second participation device, and the second participation device cannot directly obtain the client side training sample of the first participation device.

Figure 3:
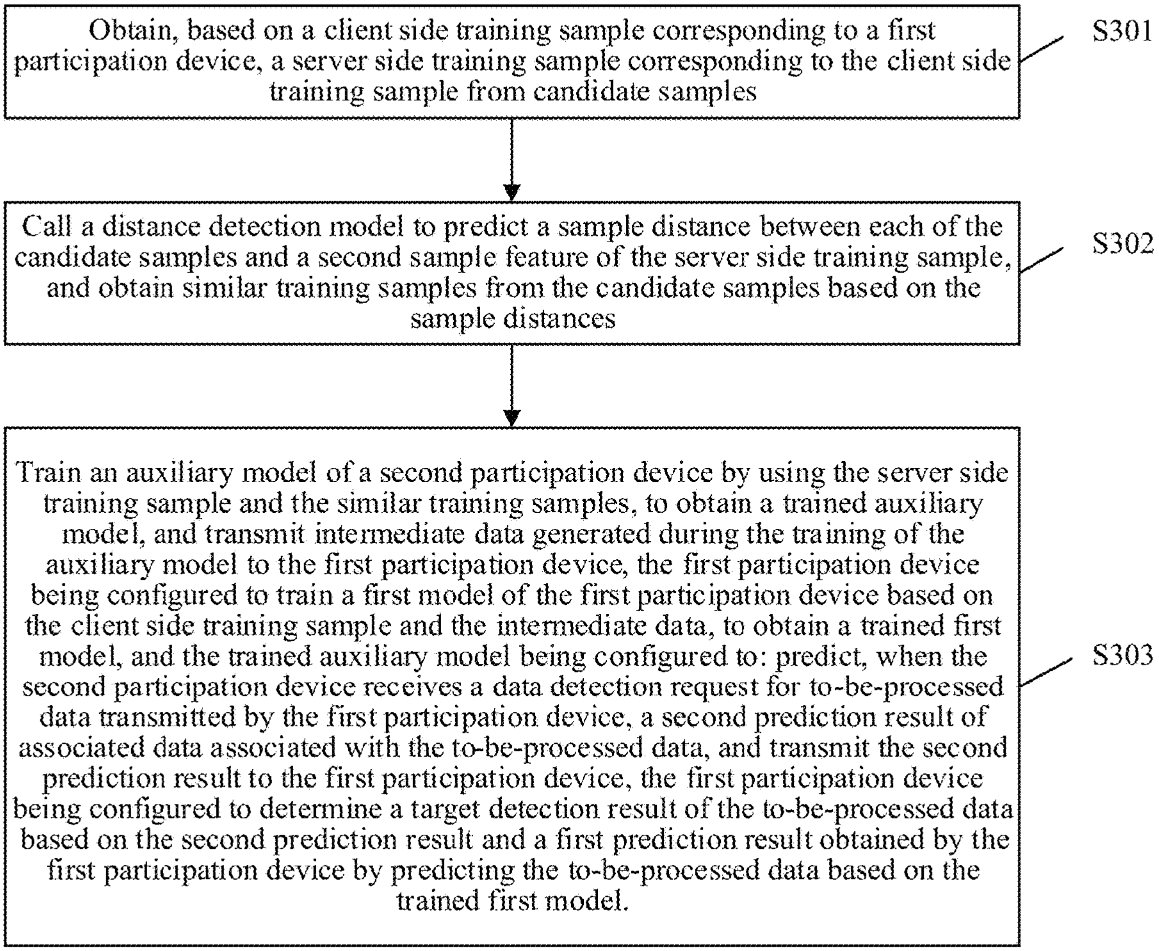
FIG. 3 is a flowchart of a data processing method for a federated learning system according to an embodiment of this application.

Further, FIG. 3 is a flowchart of a data processing method for a federated learning system according to an embodiment of this application. The federated learning system includes a first participation device having a client side training sample and a second participation device having candidate samples. As shown in FIG. 3, an example in which the method is performed by the second participation device is used for description. A federated learning process includes the following operations:

Operation S301: Obtain a server side training sample corresponding to the client side training sample from the candidate samples based on the client side training sample corresponding to the first participation device, the client side training sample having a first sample feature, and the server side training sample having a second sample feature.

In this embodiment of this application, the second participation device may obtain a second sample identifier. The second sample identifier may refer to identifiers of all samples (which may be considered as the candidate samples herein) included in the second participation device. A plurality of second sample identifiers may be provided. Further, a first sample identifier corresponding to the client side training sample in the first participation device may be obtained. Intersection parsing is performed on the first sample identifier and the second sample identifier, to obtain a common sample identifier between the first sample identifier and the second sample identifier. Sample data corresponding to the common sample identifier in the candidate samples is determined as the server side training sample corresponding to the client side training sample. Any of the foregoing sample identifiers (such as the first sample identifier or the second sample identifier) may be configured for representing a unique reference of the corresponding sample, and may be configured to obtain the server side training sample associated with the client side training sample from the candidate samples. The sample identifier (which may be denoted as an ID) may be a communication account (such as a mobile number), an international mobile equipment identity (IMEI), a sample identity identifier, or another unique sample attribute. In some embodiments, the sample identifier may also be a negotiated sample attribute negotiated between the first participation device and the second participation device, or the like. For example, assuming that the client side training sample is user information, the first sample identifier may be a communication account, an IMEI, a sample identity identifier, or the like. An example in which the negotiation sample attribute (such as the sample identity identifier) negotiated between the first participation device and the second participation device is used as the sample identifier is used. The first participation device may transmit a sample identity identifier of the client side training sample to the second participation device, and the second participation device obtains a sample with the same sample identity identifier from the candidate samples as the server side training sample.

Figure 4:
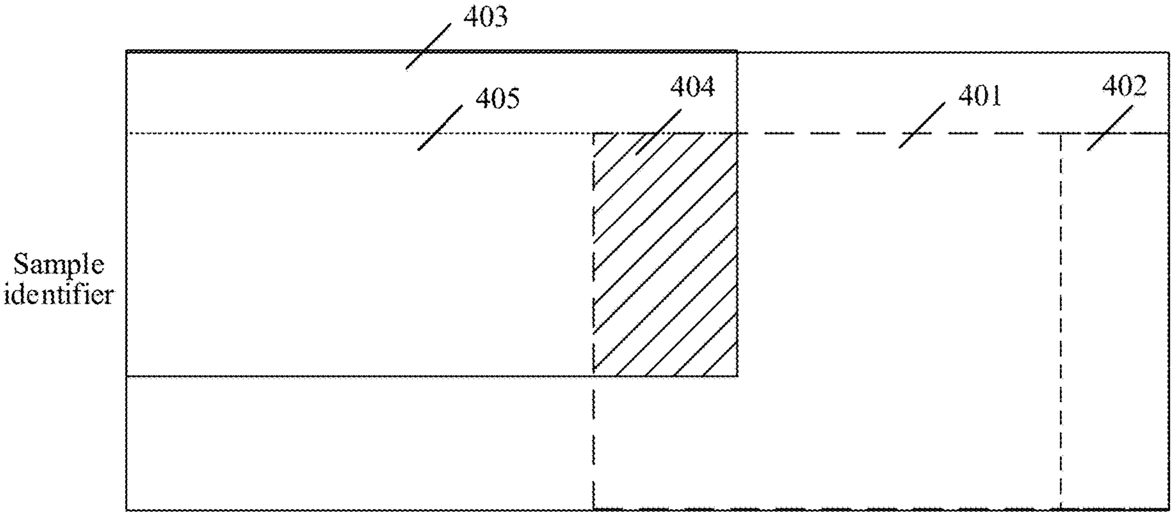
FIG. 4 is a schematic diagram showing a sample data obtaining scenario according to an embodiment of this application.

For example, FIG. 4 is a schematic diagram showing a scenario of obtaining a server side training sample according to an embodiment of this application. As shown in FIG. 4, assuming that a client side training sample exists in a first participation device, which includes a first sample feature 401 (such as an area indicated by a long dashed line) and a first sample label 402 (such as an area indicated by a short dashed line) corresponding to the first sample feature 401. The first sample feature 401 includes k first sample features. Each of the first sample features corresponds to one first sample label. To be specific, the first sample label 402 includes first sample labels respectively corresponding to k first sample features, k being a positive integer. A candidate sample 403 (such as an area indicated by a solid line) exists in a second participation device. The candidate sample 403 includes M candidate samples, M being a positive integer. Each of the candidate samples corresponds to one second sample identifier. Further, the second participation device may perform intersection parsing on a first sample identifier and the second sample identifier, to obtain a common sample identifier 404 between the first sample identifier and the second sample identifier, determine a sample corresponding to the common sample identifier in the candidate samples 403 as the server side training sample, and determine a sample feature 405 corresponding to the server side training sample as a second sample feature.

In some embodiments, the first participation device may encrypt the first sample identifier by using a second device public key of the second participation device, to obtain a first encrypted identifier corresponding to the first sample identifier, and transmit the first encrypted identifier to the second participation device. The second participation device may decrypt the first encrypted identifier by using a second device private key corresponding to the second device public key, to obtain the first sample identifier, obtain the second sample identifier of the candidate sample, perform intersection parsing on the first sample identifier and the second sample identifier to obtain the common sample identifier, and determine the sample corresponding to the common sample identifier in the candidate samples as the server side training sample corresponding to the client side training sample.

In some embodiments, to further ensure independent security of the data of the first participation device and the second participation device, the first participation device may transmit a first device public key of the first participation device to the second participation device. The second participation device may encapsulate the second sample identifier based on the first device public key, and transmit the encapsulated second sample identifier to the first participation device. The first participation device processes the encapsulated second sample identifier by using a first device private key corresponding to the first device public key, to obtain second identifier ciphertext information corresponding to the second sample identifier, generates first identifier ciphertext information corresponding to the first sample identifier by using the first device private key, and transmits the second identifier ciphertext information and the first identifier ciphertext information to the second participation device. The second participation device obtains the second identifier ciphertext information of the second sample identifier corresponding to the candidate sample, and obtains the first identifier ciphertext information of the first sample identifier corresponding to the client side training sample in the first participation device. The first sample identifier is a sample identifier corresponding to the client side training sample in the first participation device. The second participation device performs intersection parsing on the first identifier ciphertext information and the second identifier ciphertext information, determines a common sample identifier between the client side training sample and the candidate sample, and obtains a sample corresponding to the common sample identifier from the candidate sample as the server side training sample corresponding to the client side training sample. In this way, each of the first participation device and the second participation device is allowed to finally obtain only the common sample identifier, rather than obtaining data not owned by itself but owned by the other party, thereby improving data security. For example, the first sample identifier included in the first participation device is denoted as $ID_A$. Assuming that $ID_A=\{ID_1, ID_2, ID_3, ID_5\}$, the second sample identifier corresponding to the candidate sample included in the second participation device include is denoted as $ID_B$. Assuming that $ID_B=\{ID_1, ID_2, ID_3, ID_4\}$, without exposing $ID_4$ and $ID_5$, the common sample identifier obtained by the first participation device and the second participation device includes "$ID_1$, $ID_2$, $ID_3$." In other words, the first participation device cannot obtain $ID_4$, and the second participation device cannot obtain $ID_5$, which ensures data independence of the first participation device and the second participation device, and improves the data security.

The second sample feature may be considered as a second feature h of the server side training sample in the second participation device, and the first sample feature may be considered as a first feature g of the client side training sample in the first participation device. The client side training sample may carry a first sample label.

Operation S302: Call a distance detection model to predict a sample distance between the candidate sample and the second sample feature of the server side training sample, and obtain similar training samples from the candidate samples based on the sample distances.

In this embodiment of this application, the second participation device may call the distance detection model to predict the sample distance between the candidate sample and the second sample feature. The distance detection model is trained based on a first distance sample, a second distance sample, and a distance label between the first distance sample and the second distance sample. The sample distance is configured for representing a distribution similarity between a sample feature of the candidate sample and the second sample feature. In some embodiments, in a manner, the second participation device may call the distance detection model to predict the sample feature of the candidate sample and predict the second sample feature of the server side training sample, fuse the sample feature and the second sample feature to obtain a fused sample feature, and predict the sample distance between the candidate sample and the server side training sample based on the fused sample feature. Alternatively, the second participation device may call the distance detection model to extract combined features of the candidate sample and the server side training sample to obtain fused sample features corresponding to the candidate sample and the server side training sample, and predict the sample distance between the candidate sample and the server side training sample based on the fused sample features, or the like. The sample distance may be considered as a Wasserstein distance (W distance) between the corresponding candidate sample and the server side training sample, which may be configured for measuring a similarity between two distributions, configured for representing the distribution similarity between the candidate sample and the server side training sample, and configured for representing a minimum cost required for converting the candidate sample into the server side training sample. Therefore, a smaller distance between the candidate sample and the server side training sample indicates a higher similarity between the candidate sample and a business need scenario to which the server side training sample is adapted. Therefore, similar training samples may be obtained through the sample distance, so that the similar training samples and the server side training sample may be configured to train the same model, thereby implementing sample enhancement, improving the model training efficiency and effect, and the like. A closer sample distance to 0 may indicate a higher similarity between the corresponding candidate sample and the server side training sample. A further sample distance to 0 may indicate a lower similarity between the corresponding candidate sample and the server side training sample.

Further, the second participation device may determine, as the similar training samples, the candidate samples corresponding to the sample distances that satisfy a sample similarity condition among the candidate samples. In some embodiments, each of the similar training samples may carry a second sample label. M candidate samples may be provided, M being a positive integer. The sample similarity condition may include but is not limited to the sample distance being less than or equal to a sample similarity threshold, c candidate samples with the smallest sample distance, within a specified distance proportion range, or the like, c being a positive integer. For example, assuming that the sample similarity condition is that the sample distance is less than the sample similarity threshold, and the sample similarity threshold is 0.3, candidate samples with the sample distance less than the sample similarity threshold among the M candidate samples may be determined as the similar training samples. In the manner, a relatively high similarity between the obtained similar training samples and the server side training sample may be obtained, and the similar training samples may be adapted to a target business need scenario corresponding to the client side training sample, thereby improving accuracy and performance of a model obtained through federated learning while implementing sample enhancement. For example, assuming that the sample similarity condition is the c candidate samples with the smallest sample distance, the second participation device may rank the M candidate samples based on the sample distance between each of the M candidate samples and the server side training sample, and determine first c candidate samples among the ranked M candidate samples as similar training samples. Assuming that the sample similarity condition is within the specified distance proportion range, and the specified distance proportion range is top 20%, the second participation device may rank the M candidate samples based on the sample distance between each of the M candidate samples and the server side training sample, and determine top 20% of the M ranked candidate samples as the similar training samples, the like.

Further, the second participation device may obtain the first distance sample and the second distance sample, and obtain a first data cluster to which the first distance sample belongs and a second data cluster to which the second distance sample belongs; and determine the distance label between the first distance sample and the second distance sample based on a cluster relationship between the first data cluster and the second data cluster. The cluster relationship includes a first cluster relationship and a second cluster relationship. The first cluster relationship is configured for representing that the first data cluster and the second data cluster are the same data cluster, and the second cluster relationship is configured for representing that the first data cluster and the second data cluster are different data clusters. If the cluster relationship between the first data cluster and the second data cluster is the first cluster relationship, first label data (such as 0) may be determined as the distance label between the first distance sample and the second distance sample. If the cluster relationship between the first data cluster and the second data cluster is the second cluster relationship, second label data (such as 1) may be determined as the distance label between the first distance sample and the second distance sample. A data cluster may be considered as a source of resources, and it may be considered that the distance samples included in each data cluster belong to the same or similar business need scenarios, or it may be considered that the distance samples included in each data cluster belong to the same object (such as an enterprise or a department), or the like. In other words, it may be considered that the distance samples in the same data cluster can be applied to the same business need scenario. Further, the second participation device may call an initial distance detection model to predict a predicted distance between the first distance sample and the second distance sample, and perform parameter adjustment on the initial distance detection model based on the predicted distance and the distance label, to obtain the distance detection model.

Figure 5:
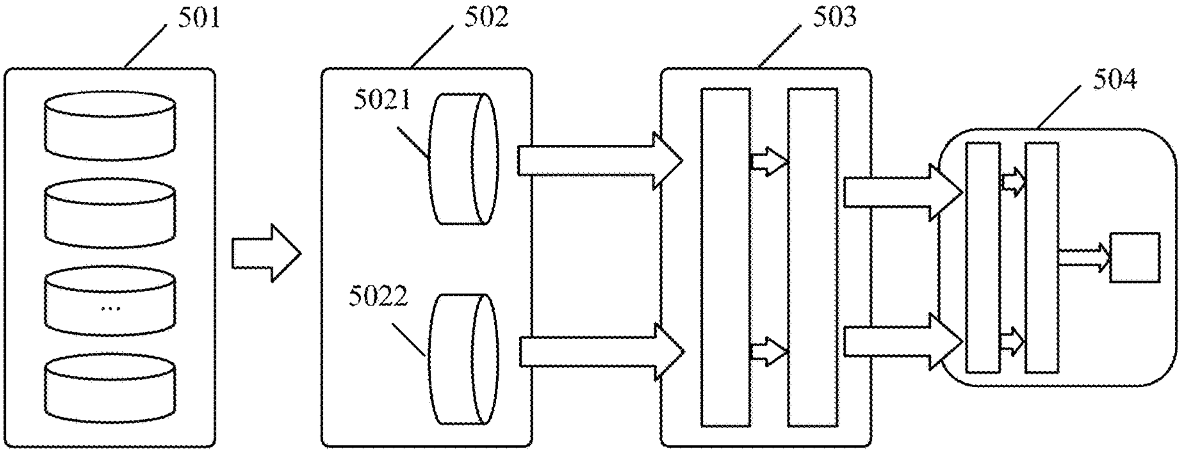
FIG. 5 is a schematic diagram of an architecture of a distance detection model according to an embodiment of this application.

For example, FIG. 5 is a schematic diagram showing an architecture of a distance detection model according to an embodiment of this application. As shown in FIG. 5, a first data cluster 5021 and a second data cluster 5022 may be obtained from a data cluster library 501. The first data cluster 5021 and the second data cluster 5022 may be the same data cluster, or may be different data clusters. A first distance sample is obtained from the first data cluster 5021 through a batch generator 502, and a second distance sample is obtained from the second data cluster 5022. An initial distance detection model is called. A distance fusion feature corresponding to the first distance sample and the second distance sample is obtained through an initial feature extraction network 503 in the initial distance detection model. A predicted distance corresponding to the distance fusion feature is predicted through a domain-adversarial network 504. Parameter adjustment is performed on the initial distance detection model (including the initial feature extraction network 503, the domain-adversarial network 504, and the like) by using the predicted distance and a distance label, to obtain the distance detection model. During the parameter adjustment of the initial distance detection model, repeated training (or referred to as iterative parameter adjustment) is performed on the initial distance detection model by using a plurality of sample pairs until the model converges, and the initial distance detection model during the convergence is determined as the distance detection model.

Alternatively, the initial distance detection model may be called. In the initial distance detection model, feature mapping is performed on the first distance sample to obtain a first mapped feature, and a first expected distance of the first mapped feature is obtained. Feature mapping is performed on the second distance sample to obtain a second mapped feature, and a second expected distance of the second mapped feature is obtained. A predicted distance between the first distance sample and the second distance sample is predicted based on the first expected distance and the second expected distance. Parameter adjustment is performed on the initial distance detection model based on the predicted distance and the distance label, to obtain the distance detection model.

For example, for a prediction process for the first expected distance and the second expected distance, reference may be made to Formula ①:

$$W_1(P, Q) = \sup_{\|f\| \le 1} |E_{x \sim P}[f(x)] - E_{y \sim Q}[f(y)]| \quad 1$$

As shown in Formula ①, P is configured for representing the first data cluster, x is configured for representing the first distance sample, Q is configured for representing the second data cluster, and y is configured for representing the second distance sample. f( ) is configured for representing a mapping function in the initial distance detection model. For example, f(x) is configured for representing that feature mapping is performed on the first distance sample to obtain a first mapped feature. f(y) is configured for representing that feature mapping is performed on the second distance sample to obtain a second mapped feature. E is configured for representing a mathematical expectation and transforming a mapped feature into an expected distance. sup is configured for performing processing such as normalization. In some embodiments, as shown in Formula ①, the first data cluster and the second data cluster may be inputted into the initial distance detection model by using the batch generator, to obtain a first mapped feature of each first distance sample in the first data cluster and obtain a second mapped feature of each second distance sample in the second data cluster. A first cluster expectation of the first data cluster is determined based on the first mapped feature of each first distance sample. A second cluster expectation of the second data cluster is determined based on the second mapped feature of each second distance sample. A predicted cluster distance $W_1(P, Q)$ between the first data cluster and the second data cluster is predicted based on the first cluster expectation and the second cluster expectation. Parameter adjustment is performed on the initial distance detection model based on the predicted cluster distance and a standard cluster distance between the first data cluster and the second data cluster, to obtain the distance detection model.

Through the sample distance predicted by the distance detection model, a problem of gradient disappearance does not occur when a distribution distance between two batches of data is excessively large. Moreover, when the distribution distance between the two batches of data is excessively large or excessively small, the sample distance between the two batches of data may be obtained or measured, which may improve accuracy of prediction of the sample distance.

Operation S303: Train an auxiliary model of the second participation device by using the server side training sample and the similar training samples, to obtain a trained auxiliary model, and transmit intermediate data generated during the training of the auxiliary model to the first participation device, the first participation device being configured to train a first model of the first participation device based on the client side training sample and the intermediate data, to obtain a trained first model.

The trained auxiliary model is configured to: predict, when the second participation device receives a data detection request for to-be-processed data transmitted by the first participation device, a second prediction result of associated data associated with the to-be-processed data, and transmit the second prediction result to the first participation device, the first participation device being configured to determine a target detection result of the to-be-processed data based on the second prediction result and a first prediction result obtained by the first participation device by predicting the to-be-processed data based on the trained first model.

In this embodiment of the application, a computer device may perform parameter adjustment on the auxiliary model (including a second model and a parsing model associated with the second model) by using the server side training sample and the similar training samples, to obtain the trained auxiliary model (including a trained second model and a trained parsing model). Further, second intermediate data generated during the parameter adjustment of the auxiliary model may be transmitted to the first participation device. The second intermediate data may include a second sample prediction result generated during training of the second model, a sample parsing result generated during training of the parsing model, and the like. During the parameter adjustment of the auxiliary model, the second participation device may also obtain first intermediate data transmitted by the first participation device, and perform parameter adjustment on the auxiliary model by using the first intermediate data, the server side training sample, and the similar training samples, to obtain the trained auxiliary model.

In some embodiments, the second participation device may perform parameter adjustment on the parsing model by using the server side training sample, to obtain the trained parsing model, keeps parameters of the trained parsing model unchanged, and performs parameter adjustment on the second model by using the server side training sample and the similar training samples, to obtain the trained second model. Specifically, the second participation device is configured to: call the second model to predict the second sample prediction result corresponding to the server side training sample, and call the parsing model associated with the second model to predict a sample parsing result of the second sample prediction result corresponding to the server side training sample; obtain a first sample prediction result predicted by the first participation device for the client side training sample, and perform parameter adjustment on the parsing model based on prediction difference information between the sample parsing result and the first sample prediction result, to obtain a trained parsing model; call the second model to predict a second sample prediction result corresponding to the server side training sample and the similar training samples, and call the trained parsing model to predict a sample parsing result of the second sample prediction result corresponding to the server side training sample and the similar training samples; and transmit, to the first participation device, the second sample prediction result corresponding to the server side training sample and the similar training samples, and the sample parsing result predicted by the trained parsing model, so that the first participation device performs parameter adjustment on the first model based on the second sample prediction result corresponding to the server side training sample and the similar training samples, the sample parsing result predicted by the trained parsing model, and the client side training sample, to obtain the trained first model. In some embodiments, during the foregoing parameter adjustment of the second model and the parsing model, the intermediate data (or referred to as the first intermediate data) generated during parameter adjustment of the first model by using the first participation device, such as the first sample prediction result, may also be used to participate in the parameter adjustment processes of the second model and the parsing model. In other words, the parsing model may be trained first, and then the second model is trained.

In some embodiments, the intermediate data (the first intermediate data) may include a gradient update parameter. When the first intermediate data is used to participate in the parameter adjustment process of the second model, a model parameter of the second model may be adjusted by using the gradient update parameter, to obtain an updated model parameter. When the updated model parameter satisfies a model convergence condition, a second model including the updated model parameter is determined as the trained second model.

In some embodiments, the intermediate data (the first intermediate data) may include gradient update ciphertext. The gradient update ciphertext is obtained by encrypting the gradient update parameter. When the first intermediate data is used to participate in the parameter adjustment process of the second model, the model parameter of the second model may be encrypted by using a first homomorphic key, to obtain parameter ciphertext. Ciphertext adjustment is performed on the parameter ciphertext based on the gradient update ciphertext, to obtain updated parameter ciphertext, and the updated parameter ciphertext is decrypted by using a second homomorphic key corresponding to the first homomorphic key, to obtain an updated model parameter. When the updated model parameter satisfies a model convergence condition, a second model including the updated model parameter is determined as the trained second model. A result obtained after encryption of the updated model parameter obtained after the model parameter and the gradient update parameter are adjusted by using the first homomorphic key is the same as a result obtained after the foregoing parameter ciphertext and gradient update ciphertext are adjusted in the same manner. Therefore, the parameter adjustment of the second model may be implemented through the foregoing processes.

Alternatively, the second participation device may perform parameter adjustment on the second model and the parsing model by using the server side training sample and the similar training samples, to obtain the trained second model and the trained parsing model. In other words, parameter adjustment may be synchronously performed on the second model and the parsing model. Specifically, the second participation device may be configured to: perform parameter adjustment on the parsing model by using the server side training sample, to obtain an updated parsing model; perform parameter adjustment on the second model by using the server side training sample and the similar training samples, to obtain an updated second model; and iteratively update the updated parsing model and the updated second model, and determine the updated second model as the trained second model and determine the updated parsing model as the trained parsing model when parameters of the updated parsing model and the updated second model converge.

Specifically, the second participation device may call, in an $i^{th}$ round of model training, a second model (referred to as a second model (i−1)) obtained through an $(i-1)^{th}$ round of model training to predict a second sample prediction result $$R_{si}^{com}$$

corresponding to the server side training sample, and call a parsing model (i−1) obtained through the $(i-1)^{th}$ round of model training to predict a sample parsing result $$R'_{t(i-1)}$$

of the second sample prediction result $$R_{si}^{com}.$$

A first sample prediction result $R_{ti}$ predicted by the first participation device for the client side training sample is obtained, and parameter adjustment is performed on the parsing model (i−1) based on prediction difference information between the sample parsing result $$R'_{t(i-1)}$$

and the first sample prediction result $R_{ti}$, to obtain a parsing model i after the $i^{th}$ round of model training. First intermediate data i includes the first sample prediction result $R_{ti}$. The second model (i−1) is called to predict a second sample prediction result $R_{si}$ corresponding to the server side training sample and the similar training samples, and the parsing model i is called to predict a sample parsing result $$R'_{ti}$$

of the second sample prediction result $R_{si}$. The second sample prediction result $R_{si}$ may include the second sample prediction result $$R_{si}^{com}$$

predicted for the server side training sample, and a second sample prediction result $$R_{si}^{miss}$$

predicted for the similar training samples. Specifically, the second model (i−1) may be called to predict the second sample prediction result $$R_{si}^{com}$$

corresponding to the server side training sample and the second sample prediction result $$R_{si}^{miss}$$

of the similar training samples. The parsing model i is called to predict a sample parsing result $$R'_{ti}$$

of the second sample prediction result $$R_{si}^{miss}.$$

Through parameter adjustment of the parsing model, an updated parsing model i may obtain a result as close as possible to the sample prediction result of the first model. Since sample data corresponding to the similar training samples in the first participation device is missing, the sample parsing result $$R'_{ti}$$

corresponding to the similar training samples may be predicted by using the updated parsing model i, and a predicted result of the similar training samples in the first participation device is replaced with the sample parsing result $$R'_{ti},$$

to achieve the purpose of sample enhancement, thereby improving model performance.

Further, the second sample prediction result $R_{si}$ and the sample parsing result $$R'_{ti}$$

are transmitted to the first participation device, so that the first participation device performs parameter adjustment on a first model (i−1) based on the second sample prediction result $R_{si}$, the sample parsing result $$R'_{ti},$$

and the client side training sample, to obtain an updated first model i. Parameter adjustment is performed on the second model (i−1) based on the intermediate data i (i.e., the first intermediate data i) generated during the parameter adjustment of the first model (i−1) by the first participation device, to obtain an updated second model i. For the parameter adjustment process, reference may be made to the foregoing related descriptions of the gradient update parameter, the gradient update ciphertext, and the like. In other words, the first intermediate data i may include a gradient update parameter i or gradient update ciphertext i. When parameters of the parsing model i and the second model i do not converge, an $(i+1)^{th}$ round of model training continues to be performed. When the parameters of the parsing model i and the second model i converge, the second model i is determined as the trained second model, and the parsing model i is determined as the trained parsing model.

Further, the first participation device may directly determine the trained first model as a combined model, and the second participation device may receive the combined model transmitted by the first participation device. In response to the data detection request for the to-be-processed data, the combined model is called to predict the target detection result corresponding to the to-be-processed data.

Alternatively, the combined model may be a virtual model. The second participation device may receive the data detection request for the to-be-processed data transmitted by the first participation device, and obtain the associated data associated with the to-be-processed data. Specifically, the second participation device may obtain a to-be-processed identifier of the to-be-processed data transmitted by the first participation device, and obtain associated data corresponding to the to-be-processed identifier. The trained second model is called to predict a second prediction result of the associated data, and the second prediction result is transmitted to the first participation device, so that the first participation device determines the target detection result corresponding to the to-be-processed data based on the second prediction result and the predicted first prediction result corresponding to the to-be-processed data. The first prediction result is predicted by using the trained first model.

In this embodiment of this application, the server side training sample corresponding to the client side training sample may be obtained based on the client side training sample corresponding to the first participation device. A sample distance between each of the candidate samples and the server side training sample is obtained, and similar training samples are obtained from the candidate samples based on the sample distance. The auxiliary model of the second participation device is trained by using the server side training sample and the similar training samples, to obtain the trained auxiliary model, and intermediate data generated during the training of the auxiliary model is transmitted to the first participation device, so that the first participation device trains the first model of the first participation device based on the client side training sample and the intermediate data, to obtain the trained first model. The trained first model and the trained auxiliary model are configured to jointly predict the to-be-processed data, to obtain the target detection result corresponding to the to-be-processed data. Through the foregoing process, the second participation device and the first participation device jointly implement federated learning, so that the server side training sample corresponding to the client side training sample of the first participation device may be directly obtained. The first participation device may be considered as a modeling party (a guest side). In the manner, a sample configured for joint training with the first participation device is obtained. In addition, the similar training samples may be obtained based on the sample distance, to expand a sample quantity and perform sample enhancement. In this way, sufficient samples may be provided for model training, overfitting of a model obtained through federated learning may be reduced, and generalization of the model may be improved. However, since the similar training samples are obtained based on the sample distance from the server side training sample, the similar training samples may be adapted to a business need scenario corresponding to the client side training sample, thereby improving performance of the model obtained through the federated learning.

Figure 6:
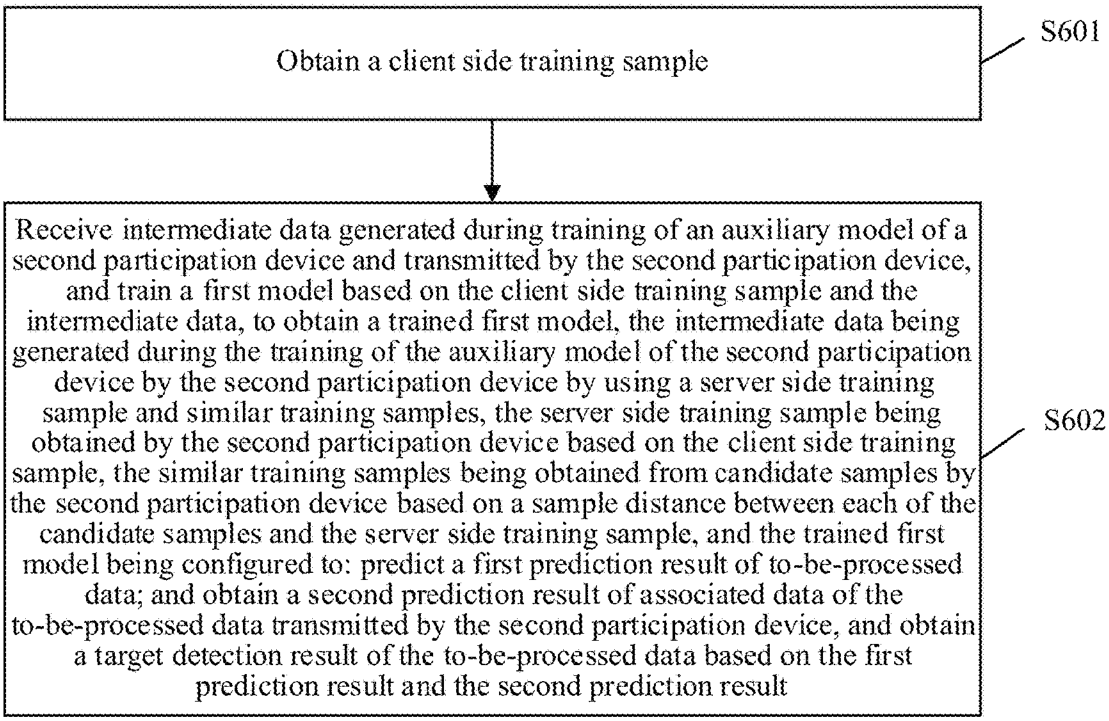
FIG. 6 is a flowchart of a data processing method for a federated learning system according to an embodiment of this application.

Further, FIG. 6 is a flowchart of a data processing method for a federated learning system according to an embodiment of this application. As shown in FIG. 6, an example in which the method is performed by a first participation device is used. A federated learning process includes the following operations:

Operation S601: Obtain a client side training sample.

In this embodiment of this application, the first participation device may obtain a client side training sample configured for training a first model. The first participation device may obtain a first sample label associated with the client side training sample. In some embodiments, a first sample identifier of the client side training sample may be encrypted and transmitted to a second participation device, so that the second participation device may obtain a server side training sample corresponding to the client side training sample and similar training samples based on the client side training sample. For the process, reference may be made to detailed description shown in operation S301 to operation S302 of FIG. 3, and details are not described herein again.

The client side training sample carries the first sample label, and each of the similar training samples carries a second sample label.

Operation S602: Receive intermediate data generated during training of an auxiliary model of the second participation device and transmitted by the second participation device, and train the first model based on the client side training sample and the intermediate data, to obtain a trained first model, the intermediate data being generated during the training of the auxiliary model of the second participation device by the second participation device by using the server side training sample and the similar training samples; the server side training sample being obtained by the second participation device based on the client side training sample, and the similar training samples being obtained from candidate samples by the second participation device based on a sample distance between each of the candidate samples and the server side training sample; and the trained first model being configured to: predict a first prediction result of to-be-processed data; and obtain a second prediction result of associated data of the to-be-processed data transmitted by the second participation device, and obtain a target detection result of the to-be-processed data based on the first prediction result and a second prediction result.

In this embodiment of this application, the intermediate data is generated during the training of the auxiliary model by the second participation device by using the server side training sample and the similar training samples. Specifically, the intermediate data includes a second sample prediction result and a sample parsing result. The auxiliary model includes a second model and a parsing model. The second sample prediction result is generated during the training of the second model by the second participation device by using the server side training sample and the similar training samples. The sample parsing result is predicted by the parsing model in training during the training of the second model by the second participation device by using the similar training samples. The server side training sample is obtained by the second participation device based on the client side training sample, and the similar training samples are obtained from the candidate samples by the second participation device based on the sample distance between the candidate sample and the server side training sample. The first participation device may receive the intermediate data (or referred to as second intermediate data) generated during the training and transmitted by the second participation device, the intermediate data including the second sample prediction result, the sample parsing result, and the like, and may train the first model based on the second intermediate data and the client side training sample, to obtain the trained first model. The first participation device may transmit intermediate data (or referred to as first intermediate data) generated during the training of the first model to the second participation device, so that the second participation device may perform model training by using the first intermediate data. The first intermediate data may include a first sample prediction result predicted for the client side training sample. The second participation device may participate in the training process of the parsing model by using the first sample prediction result. The first intermediate data may further include a gradient update parameter generated during parameter adjustment of the first model, or gradient update ciphertext generated from the gradient update parameter. The second participation device may participate in the training process of the second model by using the gradient update parameter or the gradient update ciphertext.

Specifically, the first model may include a detection network and a classifier network. The first participation device may call the detection network to predict a first sample prediction result of the client side training sample, and transmit the first sample prediction result to the second participation device, so that the second participation device performs parameter adjustment on the parsing model based on prediction difference information between the first sample prediction result and the sample parsing result, to obtain a trained parsing model. Further, the first participation device may receive the second intermediate data transmitted by the second participation device. Specifically, the first participation device receives the second sample prediction result, the sample parsing result, and the like generated during the training transmitted by the second participation device. In other words, the second intermediate data may include the second sample prediction result, the sample parsing result, and the like. Further, the first participation device may call the classifier network to predict a sample detection result corresponding to the first sample prediction result, the second sample prediction result, and the sample parsing result; and obtain a sample label corresponding to the sample detection result, perform parameter adjustment on the first model based on result deviation data between the sample detection result and the sample label, to obtain the trained first model.

The first participation device may call, in an $i^{th}$ round of model training, a detection network (i−1) obtained through an $(i-1)^{th}$ round of model training to predict a first sample prediction result $R_{ti}$ of the client side training sample, and transmit the first sample prediction result $R_{ti}$ to the second participation device, so that the second participation device performs parameter adjustment on a parsing model (i−1) based on prediction difference information between the first sample prediction result $R_{ti}$ and a sample parsing result $$R'_{t(i-1)}.$$

The sample parsing result $$R'_{t(i-1)}$$

is predicted by the second participation device by calling the parsing model (i−1), i being a positive integer. A second sample prediction result $R_{si}$ and a sample parsing result $$R'_{ti}$$

transmitted by the second participation device are obtained, the second sample prediction result $R_{si}$ being predicted by the second participation device for the server side training sample and the similar training samples through a second model (i−1), and the sample parsing result $$R'_{ti}$$

being predicted by the second participation device for the second sample prediction result $R_{si}$ through a parsing model i. The parsing model i is obtained through parameter adjustment of the parsing model (i−1). The second sample prediction result $R_{si}$ includes a sample prediction result $$R_{si}^{com}$$

of the server side training sample and a sample prediction result $$R_{si}^{miss}$$

of the similar training samples. A classifier network (i−1) is called to predict a first sample detection result $$Y'_{ti}$$

corresponding to the sample prediction result $$R_{si}^{com}$$

and the first sample prediction result $R_{ti}$, and predict a second sample detection result $$Y'_{si}$$

corresponding to the sample parsing result $$R'_{ti}$$

and the sample prediction result $$R_{si}^{miss}.$$

Parameter adjustment is performed on a first model (i−1) based on the first sample detection result $$Y'_{ti},$$

the first sample label, the second sample detection result $$Y'_{si},$$

and the second sample label, to obtain a first model i. The first model (i−1) includes the detection network (i−1) and the classifier network (i−1). When parameters of the first model i do not converge, an (i+1)$^{th}$ round of model training continues to be performed. When the parameters of the first model i converge, the first model i is determined as the trained first model.

The first participation device may determine first parameter adjustment information i for the i$^{th}$ round of model training based on the first sample detection result $$Y'_{ti}$$

and the first sample label. The first participation device may transmit the second sample detection result $$Y'_{si}$$

to the second participation device. The second participation device may determine second parameter adjustment information i for the i$^{th}$ round of model training based on the second sample detection result $$Y'_{si}$$

and the second sample label. The first participation device may perform parameter adjustment on the first model (i−1) based on the first parameter adjustment information i and the second parameter adjustment information i transmitted by the second participation device, to obtain the first model i. The first participation device may transmit first intermediate data i to the second participation device. The first intermediate data i includes the first parameter adjustment information i obtained through the i$^{th}$ round of model training. The first parameter adjustment information i may include a gradient update parameter i or gradient update ciphertext i.

In some embodiments, in the i$^{th}$ round of model training, a plurality of iterations may be performed by using samples. During model the training by using the client side training sample, parameter adjustment may be performed on the first model (i−1) based on the first sample detection result $$Y'_{ti}$$

and the first sample label, and the first intermediate data (which may include the first parameter adjustment information i herein) generated during the parameter adjustment is transmitted to the second participation device, so that the second participation device may perform parameter adjustment on the second model (i−1) by using the first intermediate data. During the model training by using the sample parsing result $$R'_{ti}$$

and the second sample prediction result $$R_{si}^{miss},$$

the first participation device may transmit the second sample detection result $$Y'_{si}$$

to the second participation device, and perform parameter adjustment on the first model (i−1) based on the second intermediate data (which may include the second parameter adjustment information i herein) transmitted by the second participation device. The first model (i−1) adjusted by using the first parameter adjustment information i and the second parameter adjustment information i may be determined as the first model i.

In some embodiments, the first participation device may determine the trained first model as a combined model, and may transmit the combined model to a target participation device. The target participation device refers to a device that needs to adopt functions of the combined model, and may include the second participation device. In response to a data detection request for the to-be-processed data, the combined model may be called to predict the target detection result corresponding to the to-be-processed data.

The first participation device may transmit the data detection request to the second participation device in response to the data detection request for the to-be-processed data, so that the second participation device obtains the associated data associated with the to-be-processed data based on the data detection request; obtain the second prediction result transmitted by the second participation device, and call the detection network to predict the first prediction result of the to-be-processed data, the second prediction result being predicted by the second participation device for the associated data; and call the classifier network to predict a target detection result corresponding to the first prediction result and the second prediction result.

In this embodiment of this application, through federated learning between the first participation device and the second participation device, sample enhancement is implemented, and performance and accuracy of the models are improved.

Figure 7:
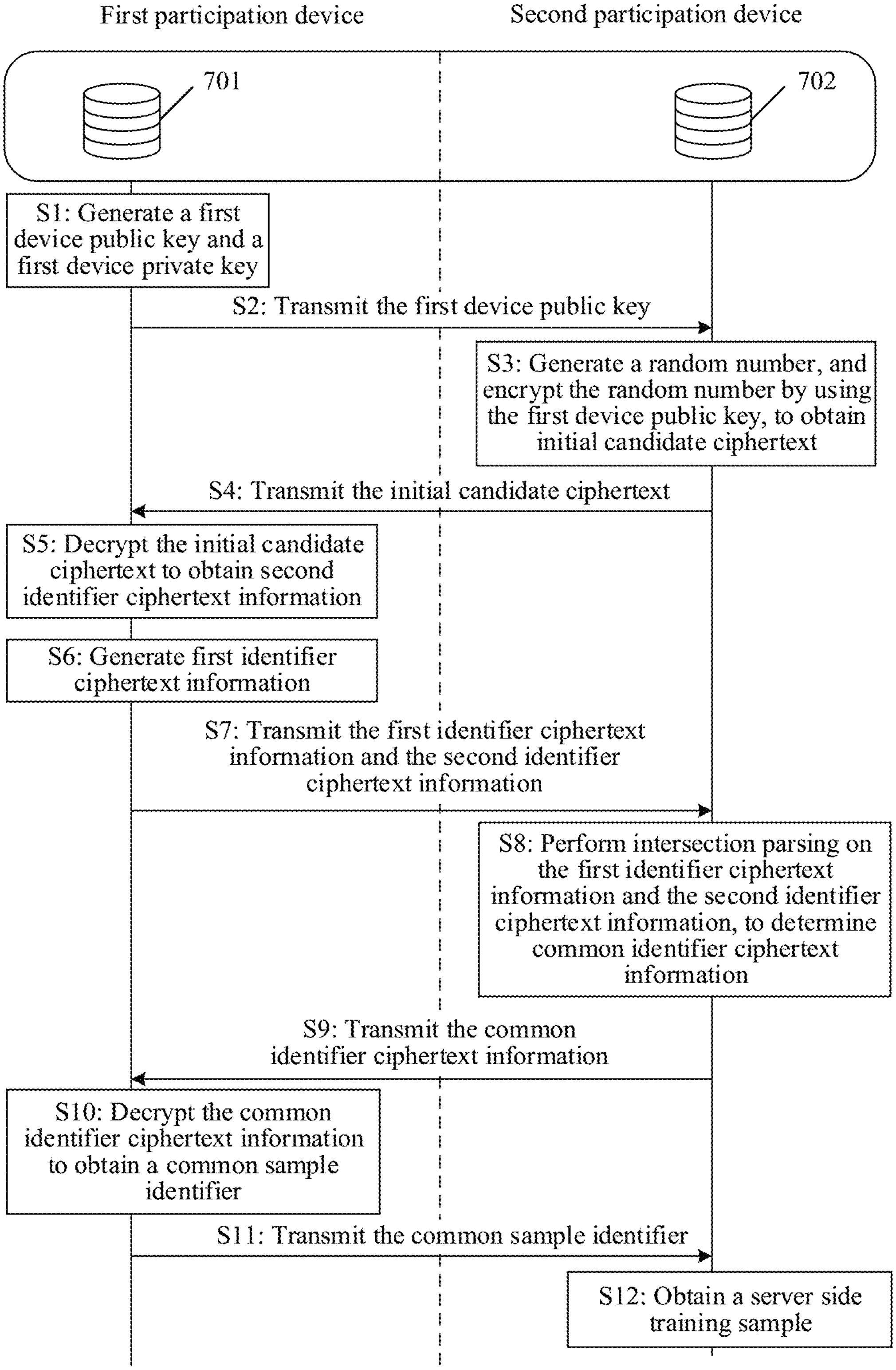
FIG. 7 is a flowchart of obtaining first sample data according to an embodiment of this application.

For a process of obtaining the server side training sample in operation S301 of FIG. 3 and operation S601 of FIG. 6, reference may be made to FIG. 7. FIG. 7 is a flowchart of obtaining a server side training sample according to an embodiment of this application. As shown in FIG. 7, a first participation device includes a client side training sample 701 configured for training a first model, and a second participation device may include candidate samples 702. The process may include the following operations:

Operation S1: Generate a first device public key and a first device private key.

In this embodiment of this application, the first participation device may generate a first device public key (n, e) and a first device private key (n, d).

Operation S2: Transmit the first device public key.

In this embodiment of this application, the first participation device transmits the first device public key (n, e) to the second participation device.

Operation S3: Generate a random number, and encrypt the random number by using the first device public key, to obtain initial candidate ciphertext.

In this embodiment of this application, the second participation device may receive the first device public key (n, e) transmitted by the first participation device, and obtain a sample quantity M of the candidate samples 702, M being a positive integer. Further, the second participation device may generate M random numbers, and encrypt the M random numbers and a second sample identifier corresponding to each of the M candidate samples by using the first device public key, to obtain initial candidate ciphertext for the M candidate samples. For example, the M random numbers include $\{r_1, \ldots, r_j, \ldots, r_M\}$. $r_j$ is configured for representing a $j^{th}$ random number, j being a positive integer less than or equal to M. The second sample identifier corresponding to each of the M candidate samples may be denoted as $ID_B$. $ID_B=\{ID_1, \ldots, ID_j, \ldots, ID_M\}$. In some embodiments, for the initial candidate ciphertext, reference may be made to Formula ②:

$$Y_B = \{(r_1 \% n) * H(ID_1), \ldots, (r_j \% n) * H(ID_j), \ldots, (r_M \% n) * H(ID_M)\} \quad 2$$

As shown in Formula ②, H may be configured for representing a hash algorithm, and $Y_B$ is configured for representing the initial candidate ciphertext. A $j^{th}$ first sample identifier is used as an example. A $j^{th}$ random coefficient may be generated by using the first device public key and the $j^{th}$ random number. Hash processing is performed on a $j^{th}$ second sample identifier, to obtain a $j^{th}$ hash identifier. The $j^{th}$ hash identifier is adjusted by using the $j^{th}$ random coefficient, to obtain a $j^{th}$ initial ciphertext parameter corresponding to a $j^{th}$ candidate sample. Similarly, initial ciphertext parameters respectively corresponding to the M candidate samples may be obtained, and the initial ciphertext parameters respectively corresponding to the M candidate samples are determined as the initial candidate ciphertext.

Operation S4: Transmit the initial candidate ciphertext.

In this embodiment of this application, the second participation device transmits the initial candidate ciphertext $Y_B$ to the first participation device.

Operation S5: Decrypt the initial candidate ciphertext to obtain second identifier ciphertext information.

In this embodiment of this application, the first participation device may decrypt the initial candidate ciphertext to obtain the second identifier ciphertext information. In some embodiments, the first participation device may decrypt the initial candidate ciphertext by using the first device private key, to obtain the second identifier ciphertext information. For a possible process of obtaining the second identifier ciphertext information, reference may be made to Formula ③:

$$Z_B = \left\{ \begin{matrix} ((r_1 \% n) * H(ID_1))^d \% n, \ldots, ((r_j \% n) * H(ID_j))^d \% n, \ldots, \\ ((r_M \% n) * H(ID_M))^d \% n \end{matrix} \right\} \quad 3$$

As shown in Formula ③, $Z_B$ is configured for representing the second identifier ciphertext information, and $((r_j\%n)*H(ID_j))^d\%n$ is configured for representing a second identification parameter corresponding to the $j^{th}$ candidate sample. Second identification parameters respectively corresponding to the M candidate samples are determined as the second identifier ciphertext information.

Operation S6: Generate first identifier ciphertext information.

In this embodiment of this application, the first participation device may generate first identifier ciphertext information corresponding to a client side training sample based on the first device private key. In some embodiments, for a possible process of obtaining the first identifier ciphertext information, reference may be made to Formula ④:

$$Z_A = \{H(H(ID)^d \% n) | ID \in ID_A\} \quad 4$$

As shown in Formula ④, $Z_A$ is configured for representing the first identifier ciphertext information, $ID_A$ is configured for representing a sample identifier of the client side training sample, and H is configured for representing the hash algorithm.

Operation S7: Transmit the first identifier ciphertext information and the second identifier ciphertext information.

In this embodiment of this application, the first participation device may transmit the first identifier ciphertext information and the second identifier ciphertext information to the second participation device.

Operation S8: Perform intersection parsing on the first identifier ciphertext information and the second identifier ciphertext information, to determine common identifier ciphertext information.

In this embodiment of this application, the second participation device receives the first identifier ciphertext information transmitted by the first participation device, and receives the second identifier ciphertext information transmitted by the first participation device; and performs the intersection parsing on the first identifier ciphertext information and the second identifier ciphertext information, to obtain the common identifier ciphertext information. Specifically, random number elimination is performed on the second identifier ciphertext information by using the M random numbers, to obtain third identifier ciphertext information. In some embodiments, for a manner of obtaining the third identifier ciphertext information, reference may be made to Formula ⑤:

$$Z_B = \left\{ \begin{array}{r} ((r_1 \ \% \ n) * H(ID_1))^d \ \% \ n, \ \ldots \ , ((r_j \ \% \ n) * H(ID_j))^d \ \% \ n, \ \ldots \ , \\ ((r_M \ \% \ n) * H(ID_M))^d \ \% \ n \end{array} \right\} \Rightarrow \tag{5}$$

$$Z'_B = \left\{ \begin{array}{r} r_1(H(ID_1))^d \ \% \ n, \ \ldots \ , r_j(H(ID_j))^d \ \% \ n, \ \ldots \ , \\ r_M(H(ID_M))^d \ \% \ n \end{array} \right\} \Rightarrow$$

$$D_B = \left\{ \begin{array}{r} H\big(H(ID_1)^d \ \% \ n\big), \ \ldots \ , H\big(H(ID_j)^d \ \% \ n\big), \ \ldots \ , \\ H\big(H(ID_M)^d \ \% \ n\big) \end{array} \right\}$$

As shown in Formula ⑤, the second participation device may simplify the second identifier ciphertext information, to obtain second simplified ciphertext information $$Z'_B.$$

Random number elimination is performed on the second simplified ciphertext information $$Z'_B$$

by using the M random numbers, to obtain third identifier ciphertext information $D_B$. In some embodiments, random number elimination may be performed on the second simplified ciphertext information $$Z'_B$$

by using the M random numbers, and hash processing is performed on the second simplified ciphertext information after the random number elimination, to obtain the third identifier ciphertext information $D_B$.

Further, the second participation device may perform intersection parsing on the third identifier ciphertext information and the first identifier ciphertext information, to obtain common identifier ciphertext information. The first identifier ciphertext information is obtained by encrypting the first sample identifier by the first participation device by using the first device private key corresponding to the first device public key. In some embodiments, the common identifier ciphertext information may be denoted as I. $I=D_B \cap Z_A$. For example, it is assumed that for an optional result of the common identifier ciphertext information, reference may be made to Formula ⑥:

$$I = D_B \cap Z_A = \{H\big(H(ID_1)^d \ \% \ n\big), H\big(H(ID_2)^d \ \% \ n\big), H\big(H(ID_3)^d \ \% \ n\big)\} \tag{6}$$

In this case, the first device private key exists in the common identifier ciphertext information.

Operation S9: Transmit the common identifier ciphertext information.

In this embodiment of this application, the second participation device may transmit common identifier ciphertext information I to the first participation device.

Operation S10: Decrypt the common identifier ciphertext information to obtain a common sample identifier.

In this embodiment of this application, the first participation device may decrypt the common identifier ciphertext information by using the first device private key, to obtain the common sample identifier. As shown in Formula ⑥, the common identifier ciphertext information is decrypted by using the first device private key (n, d), to obtain the common sample identifier. The common sample identifier may include $\{ID_1, ID_2, ID_3\}$.

Operation S11: Transmit the common sample identifier.

In this embodiment of this application, the first participation device may transmit the common sample identifier to the second participation device.

Operation S12: Obtain the server side training sample.

In this embodiment of this application, the second participation device may receive the common sample identifier transmitted by the first participation device, and determine a sample corresponding to the common sample identifier among the candidate samples as the server side training sample corresponding to the client side training sample.

Through the operations shown in FIG. 7, secure intersection of the sample identifiers is implemented, and data security of the first participation device and the second participation device is ensured.

Figure 8:
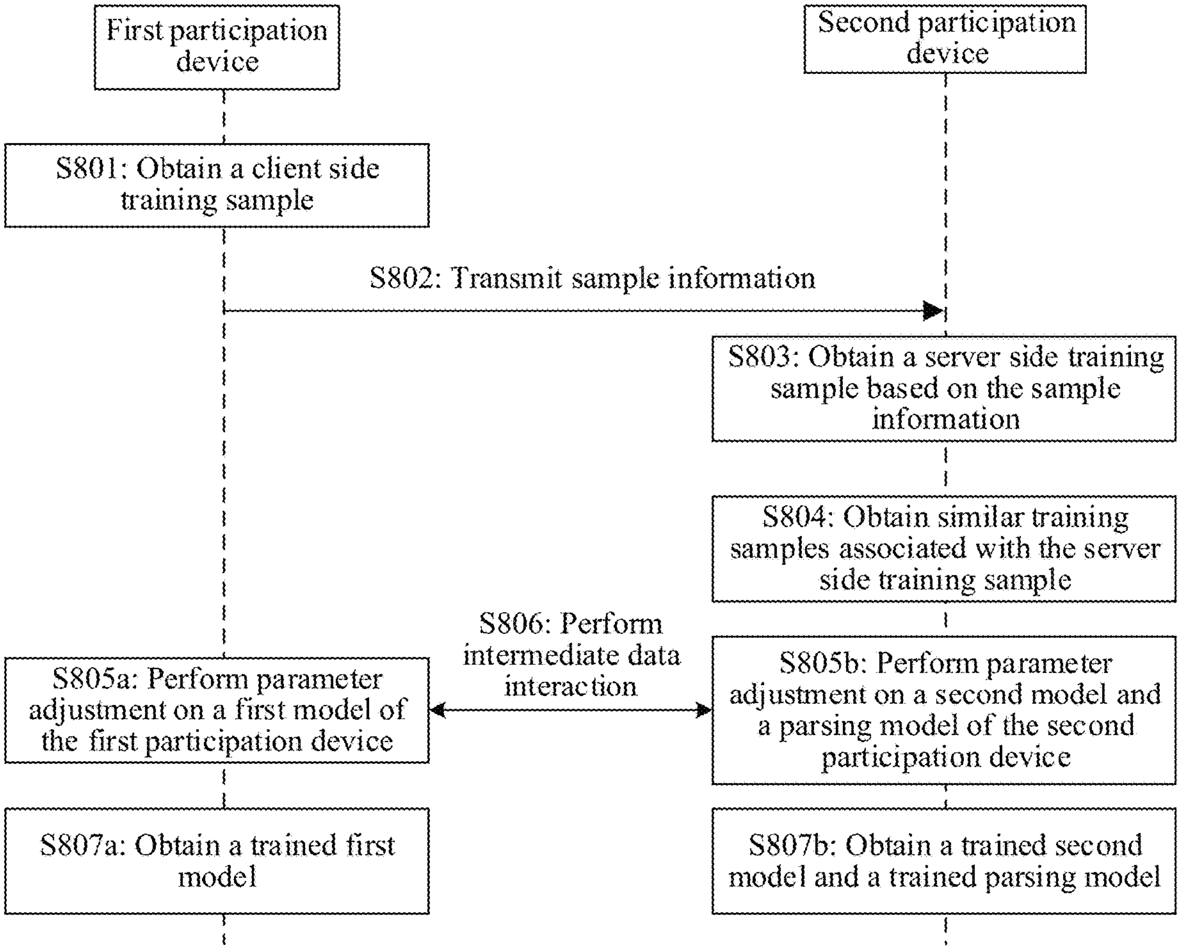
FIG. 8 is an interaction flowchart of a data processing method for a federated learning system according to an embodiment of this application.

Further, FIG. 8 is an interaction flowchart of a data processing method for a federated learning system according to an embodiment of this application. As shown in FIG. 8, the data processing process of the federated learning system includes the following operations:

Operation S801: Obtain a client side training sample.

Figure 9:
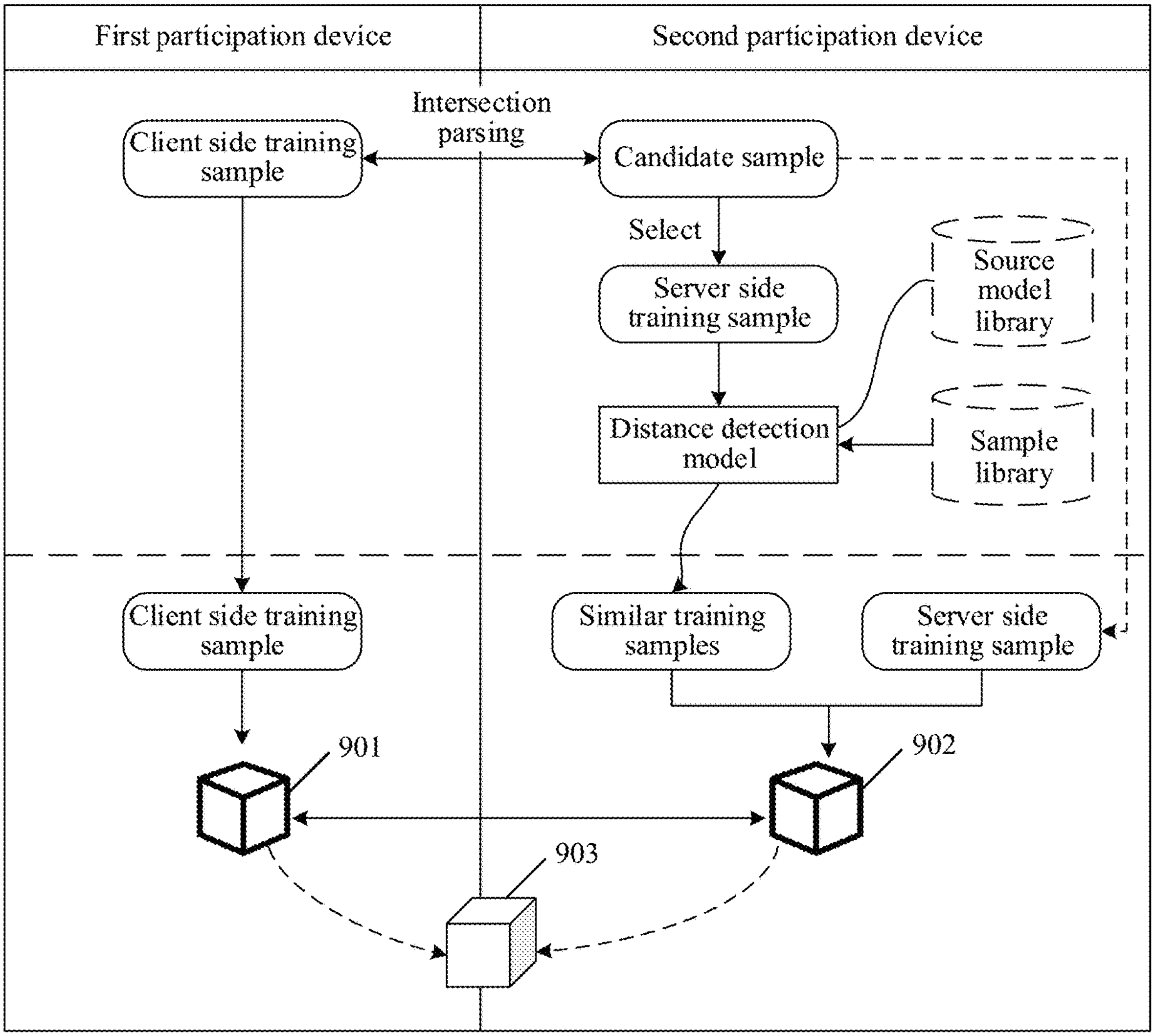
FIG. 9 is a schematic diagram showing a data interaction scenario of a federated learning system according to an embodiment of this application.

In this embodiment of this application, a first participation device may obtain the client side training sample. The client side training sample may include a first feature g of the client side training sample in the first participation device. The first participation device may further obtain a first sample label corresponding to the client side training sample. In other words, the first participation device may obtain data (including a first sample feature and the first sample label) of the client side training sample in the first participation device. For details, reference may be made to the detailed description shown in operation S601 of FIG. 6. FIG. 9 is a schematic diagram showing a data interaction scenario for a federated learning system according to an embodiment of this application. As shown in FIG. 9, a first participation device may obtain a client side training sample.

Operation S802: Transmit sample information.

In this embodiment of this application, the first participation device may transmit the sample information to a second participation device. The sample information may include a first sample identifier of the client side training sample, the sample information may include a first device public key of the first participation device, or the like.

Operation S803: Obtain a server side training sample based on the sample information.

In this embodiment of this application, the second participation device may obtain the server side training sample corresponding to the client side training sample based on the sample information. As shown in FIG. 9, the second participation device may obtain the server side training sample corresponding to the client side training sample from candidate samples based on the sample information.

For operation S802 and operation S803 described above, reference may be made to the related description shown in operation S301 of FIG. 3, and reference may also be made to the related description shown in the operations of FIG. 7. Details are not described herein again.

Operation S804: Obtain similar training samples associated with the server side training sample.

In this embodiment of this application, the second participation device may obtain the similar training samples associated with the server side training sample. As shown in FIG. 9, the second participation device may obtain an initial distance detection model from a source model library, obtain a first distance sample, a second distance sample, and the like from a sample library, and perform parameter adjustment on the initial distance detection model based on the first distance sample and the second distance sample, to obtain a distance detection model. For details, reference may be made to the related description of operation S302 of FIG. 3, and details are not described herein again.

Operation S805*a*: Perform parameter adjustment on a first model of the first participation device.

In this embodiment of this application, the first participation device performs parameter adjustment on the first model. The first model may include a detection network and a classifier network. The first participation device may perform parameter adjustment on the first model, to obtain a first updated model. During the parameter adjustment, operation S806 of transmitting first intermediate data generated during the parameter adjustment to the second participation device may be triggered. For a detailed adjustment process, reference may be made to the related description of operation S602 of FIG. 6. As shown in FIG. 9, the parameter adjustment may be performed on a first model 901 by using the client side training sample and second intermediate data transmitted by the second participation device.

Operation S805*b*: Perform parameter adjustment on a second model and a parsing model of the second participation device.

In this embodiment of this application, the second participation device may perform parameter adjustment on the second model and the parsing model, to obtain a second updated model corresponding to the second model and an updated parsing model corresponding to the parsing model. During the parameter adjustment, operation S806 of transmitting the second intermediate data generated during the parameter adjustment to the first participation device may be triggered. For details, reference may be made to the related description of operation S303 of FIG. 3. As shown in FIG. 9, the second participation device may parameter adjustment on an auxiliary model 902 by using the similar training samples, the server side training sample, and the first intermediate data transmitted by the first participation device. The auxiliary model 902 includes the second model and the parsing model.

Operation S806: Perform intermediate data interaction.

In this embodiment of this application, the intermediate data interaction may be performed between the first participation device and the second participation device. In some embodiments, intermediate data interaction may be performed through homomorphic encryption. For the data interaction process, reference may be made to the related descriptions of operation S303 of FIG. 3 and operation S602 of FIG. 6.

Operation S807*a*: Obtain a trained first model.

In this embodiment of this application, when parameters of the first updated model converge, the first updated model is determined as the trained first model.

Operation S807*b*: Obtain a trained second model and a trained parsing model.

In this embodiment of this application, when parameters of the second updated model and the updated parsing model converge, the second updated model is determined as the trained second model, and the updated parsing model is determined as the trained parsing model.

As shown in FIG. 9, a combined model 903 may be determined based on the trained first model and the trained second model.

Figure 10:
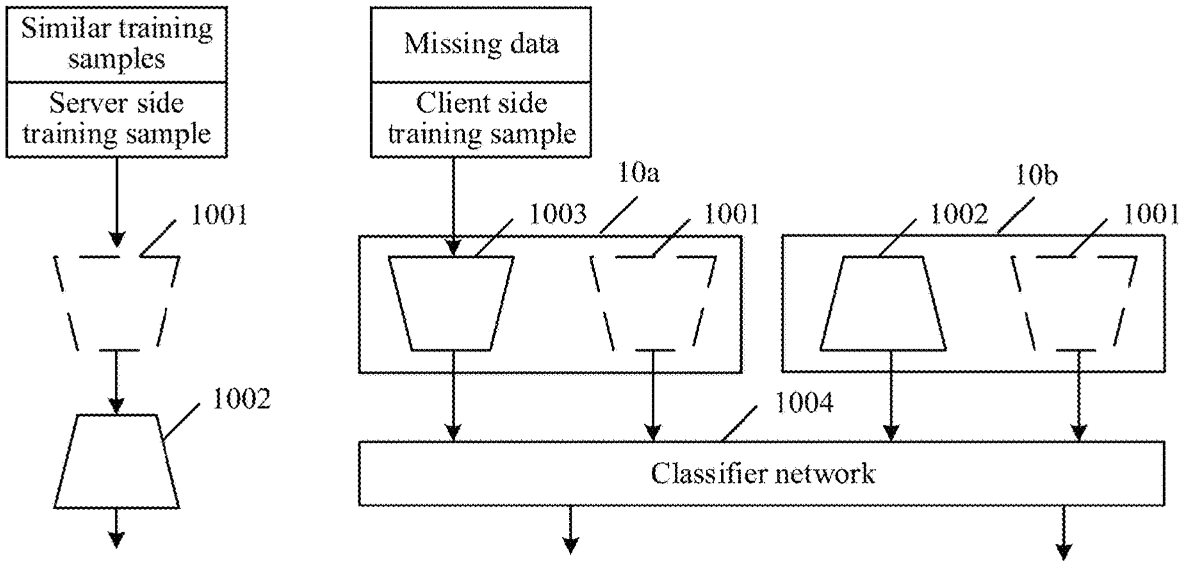
FIG. 10 is a schematic diagram showing a model training scenario according to an embodiment of this application.

Further, FIG. 10 is a schematic diagram showing a model training scenario according to an embodiment of this application. As shown in FIG. 10, a second participation device may include similar training samples $Y_s$ and a server side training sample. The similar training samples $Y_s$ are labeled samples obtained through a sample distance from the server side training sample, which may correspond to second sample labels. A first participation device may include a client side training sample. The client side training sample may include labeled sample data $Y_t$ and unlabeled sample data No_Y. The labeled sample data $Y_t$ includes a first sample label, and the unlabeled sample data No_Y refers to unlabeled samples having an identical distribution to the labeled sample data $Y_t$. Missing data refers to data that does not exist in the first participation device, and is configured for referring to sample data corresponding to the similar training samples in the second participation device in the first participation device.

In a first round of model training, the second participation device may call a second model to predict a second sample prediction result $$R_{s1}^{com}$$

corresponding to the server side training sample; and call a parsing model to predict a sample parsing result $$R_{s1}^{com}$$

of the second sample prediction result $$R'_{t0}.$$

The first participation device may call a detection network to predict a first sample prediction result $R_{t1}$ of the client side training sample, and transmit the first sample prediction result $R_{t1}$ to the second participation device. The second participation device may perform parameter adjustment on the parsing model based on prediction difference information between the sample parsing result $$R'_{t0}$$

and the first sample prediction result $R_{t1}$, to obtain a parsing model 1 for the first round of model training. In some embodiments, during the parameter adjustment of the parsing model, a parameter of the second model may be fine-tuned. The operation may be an optional operation. The second participation device may call the second model to predict a second sample prediction result $R_{s1}$ corresponding to the server side training sample and the similar training samples, call the parsing model 1 to predict a sample parsing result $$R'_{t1}$$

of the second sample prediction result $R_{s1}$, and transmit the sample parsing result $$R'_{t1}$$

of the second sample prediction result $R_{s1}$ to the first participation device. The first participation device may call a classifier network to predict a sample detection result corresponding to the second sample prediction result $R_{s1}$ and the first sample prediction result $R_{t1}$. The sample detection result may include a first sample detection result and a second sample detection result. Parameter adjustment is performed on the first model based on the sample detection result to obtain an updated first model. In some embodiments, the first participation device may transmit first intermediate data 1 generated during the parameter adjustment of the first model to the second participation device. The second participation device may perform parameter adjustment on the second model based on the first intermediate data 1, to obtain a first model 1 for the first round of model training.

Further, based on the first round of model training, an $i^{th}$ round of model training is used as an example, i being a positive integer. The details are as follows:

(1) The second participation device may call a second model (i−1) obtained through an $(i-1)^{th}$ round of model training, as shown in an area 1001, to predict a second sample prediction result $$R_{si}^{com}$$

corresponding to the server side training sample, and call a parsing model (i−1) obtained through the $(i-1)^{th}$ round of model training to predict a sample parsing result $$R'_{t(i-1)}$$

of the second sample prediction result $$R_{si}^{com}$$

as shown in an area 1002.

(2) The first participation device may call a detection network (i−1) obtained through the $(i-1)^{th}$ round of model training, as shown in an area 1003, to predict a first sample prediction result $R_{ti}$ of the client side training sample, and transmit the first sample prediction result $R_{ti}$ to the second participation device.

(3) The second participation device may perform parameter adjustment on the parsing model (i−1) obtained through the $(i-1)^{th}$ round of model training based on prediction difference information between the sample parsing result $$R'_{t(i-1)}$$

and the first sample prediction result $R_{ti}$, to obtain a parsing model i for the $i^{th}$ round of model training. For example, a first loss function may be generated based on the prediction difference information between the sample parsing result $$R'_{t(i-1)}$$

and the first sample prediction result $R_{ti}$, and parameter adjustment may be performed on the parsing model (i−1) based on the first loss function, to obtain an updated parsing model i. The first loss function may be denoted as $$\text{Loss}_1(R'_{t(i-1)}, R_{ti}),$$

so that an updated auxiliary model i may gradually have a function of generating an auxiliary enhancement feature of sample data of the client side training sample in the first participation device.

(4) The second participation device may call the second model (i−1), as shown in the area 1001, to predict a second sample prediction result $R_{si}$ corresponding to the server side training sample and the similar training samples, and call the updated parsing model i to predict a sample parsing result $$R'_{ti}$$

of the second sample prediction result $R_{si}$. The second sample prediction result $R_{si}$ may include the second sample prediction result $$R_{si}^{com}$$

predicted for the server side training sample, and a second sample prediction result $$R_{si}^{miss}$$

predicted for the similar training samples. The sample parsing result $$R'_{ti}$$

may be predicted for the second sample prediction result $$R_{si}^{miss},$$

and may be configured for referring to a prediction result of the similar training samples in the detection network (i−1), i.e., a prediction result for the missing data. The second sample prediction result $R_{si}$ and the sample parsing result $$R'_{ti}$$

are transmitted to the first participation device.

(5) The first participation device may call a classifier network (i−1), as shown in an area 1004, to predict a first sample detection result $$Y'_{ti}$$

corresponding to the second sample prediction result $$R_{si}^{com}$$

and the first sample prediction result $R_{ti}$ (such as data indicated by an area 10*a*), and predict a second sample detection result $$Y'_{si}$$

corresponding to the sample parsing result $$R'_{ti}$$

and the second sample prediction result $$R_{si}^{miss}$$

(such as data indicated by an area 10*b*). Parameter adjustment is performed on a second model (i−1) based on the first sample detection result $$Y'_{ti},$$

a first sample label, the second sample detection result $$Y'_{si},$$

and a second sample label, to obtain an updated second model i. In some embodiments, a second loss function may be generated based on the first sample detection result $$Y'_{ti}$$

and a first sample label $Y_t$. The second sample detection result $$Y'_{si}$$

is transmitted to the second participation device. The second participation device may generate a third loss function based on the second sample detection result $$Y'_{si}$$

and the second sample label. Further, the first participation device may receive the third loss function transmitted by the second participation device, and perform parameter adjustment on the first model (i−1) based on the second loss function and the third loss function, to obtain an updated first model i. Alternatively, the second participation device may determine second parameter adjustment information i based on the third loss function. The first participation device may parameter adjustment on the first model (i−1) based on the second loss function and the second parameter adjustment information i transmitted by the second participation device, to obtain a first model i. The second loss function may be denoted as $$\text{Loss}(Y'_{ti}, Y_t|R_{ti}, R_{si}^{com}),$$

and the third loss function may be denoted as $$\text{Loss}_3(Y'_{si}, Y_s|R'_{ti}, R_{si}^{miss}).$$

The first model i includes a detection network i and a classifier network i. Further, when the parameters of the first model i converge, the first model i is determined as a trained first model.

(6) The first participation device may transmit first intermediate data i generated during the parameter adjustment of the first model (i−1) to the second participation device. In some embodiments, the first intermediate data i may include a gradient update parameter i, and the like. Alternatively, gradient update ciphertext i may be generated based on the gradient update parameter i. The first intermediate data i may include the gradient update ciphertext i, and the like.

(7) The second participation device may perform parameter adjustment on the second model (i−1) based on the first intermediate data i generated during the parameter adjustment of the first model (i−1) by the first participation device, to obtain a second model i. Further, when the parameters of the parsing model i and the second model i converge, the second model i is determined as a trained second model, and the parsing model i is determined as a trained parsing model. The trained second model and the trained parsing model may be collectively referred to as a trained auxiliary model. In some embodiments, when the first intermediate data i may include the gradient update ciphertext i, for the parameter adjustment process, reference may be made to the related description of operation S303 of FIG. 3.

In some embodiments, in the foregoing process, during data interaction of the first intermediate data and the second intermediate data, model updating may be performed by updating a homomorphic encryption gradient. During the whole training, adversarial training of models or networks other than the classifier network, the training of the classifier network, and the like may be alternately performed until the networks converge, to obtain a final parsing model and a final second model.

The second model may be considered as an encoder, and the parsing model may be considered as a decoder.

Figure 11A:
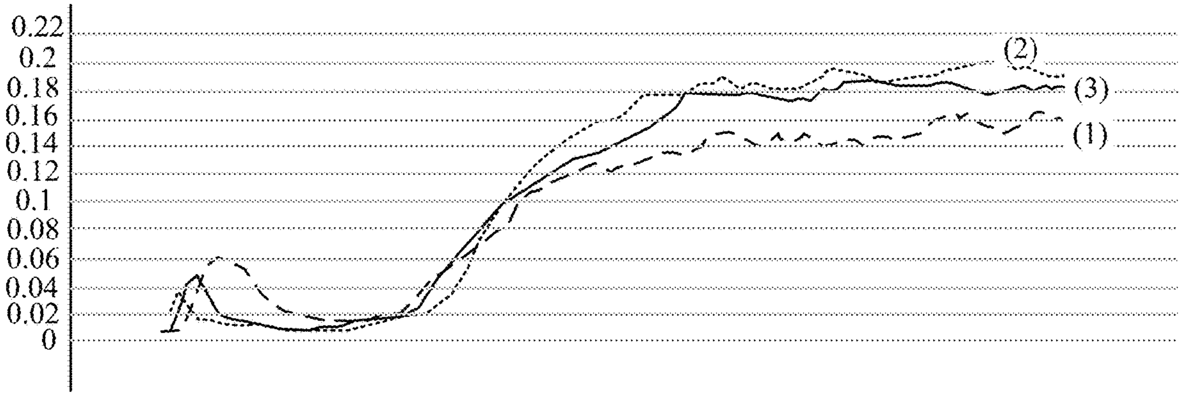
FIG. 11A is a schematic diagram showing a model effect according to an embodiment of this application.
Figure 11B:
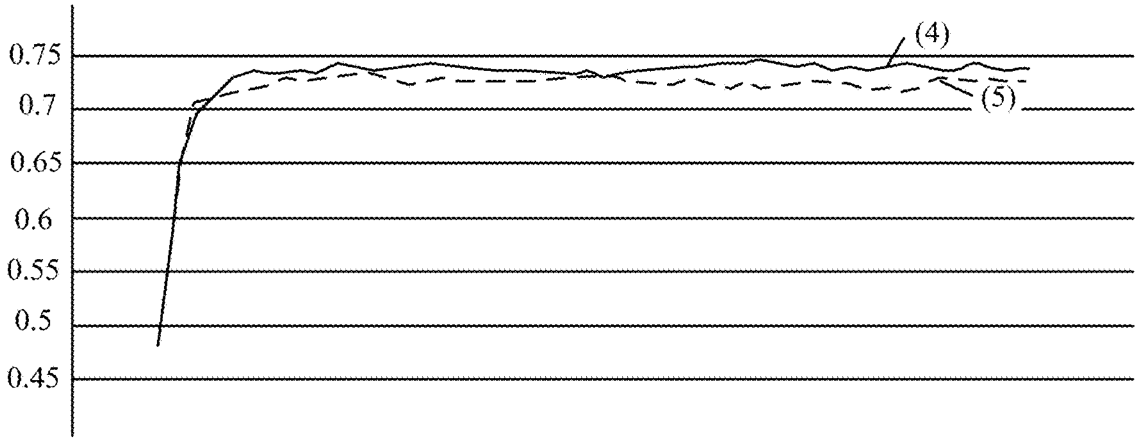
FIG. 11B is a schematic diagram showing another model effect according to an embodiment of this application.

Further, FIG. 11A is a schematic diagram showing a model effect according to an embodiment of this application. FIG. 11A shows a model application effect when it is assumed that a target business need scenario is a financial anti-fraud scenario. It is assumed that 3 k labeled samples exist in a first participation device. A long dashed line (1) represents an effect of a conventional vertical federated algorithm, a solid line (3) represents an effect after sample enhancement and feature enhancement are performed on the 3 k labeled samples, and a dotted line (2) represents an effect after sample enhancement and feature enhancement are performed on the 3 k labeled samples and 2.7 W unlabeled samples having an identical distribution. Compared with the conventional vertical federated learning, the model effect in the anti-fraud scenario is improved by 20%. In addition, it is proved that addition of the unlabeled samples to the first participation device can enhance the model effect. Further, FIG. 11B is a schematic diagram showing another model effect according to an embodiment of this application. As shown in FIG. 11B, based on 3 k labeled samples, a solid line (4) represents an effect of an algorithm of this application, and a dashed line (5) represents an effect of a conventional vertical federated algorithm. An AUC of the model increases from 71.28 to 74.35, with an effect increase of 4.3%. The entire test result proves effectiveness of this application, and the effect and a generalization capability of a combined model can be improved through migration manners including sample enhancement and feature enhancement.

Figure 12:
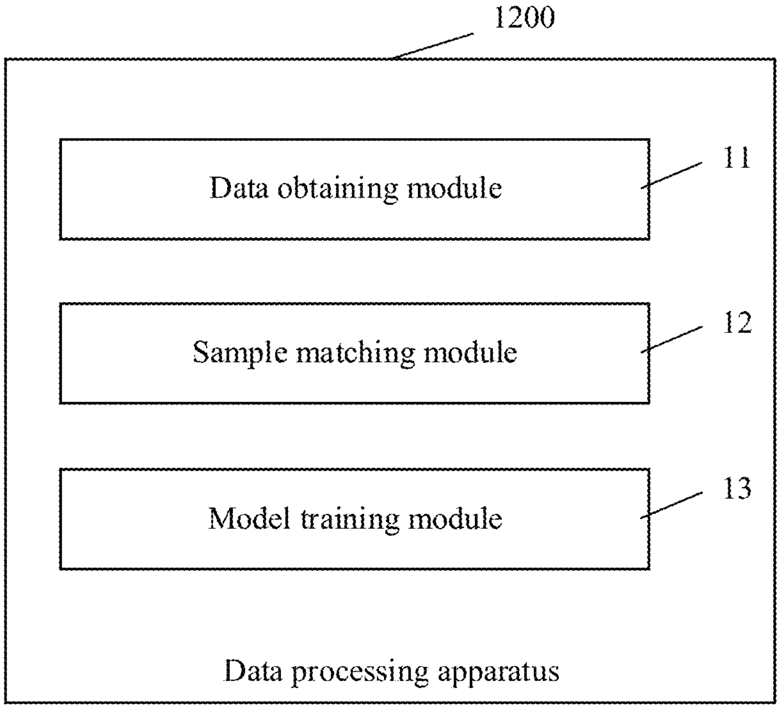
FIG. 12 is a schematic diagram of a data processing apparatus for a federated learning system according to an embodiment of this application.

Further, FIG. 12 is a schematic diagram of a data processing apparatus for a federated learning system according to an embodiment of this application. The data processing apparatus may be a computer program (including program code, and the like) running in a computer device. For example, the data processing apparatus may be application software. The apparatus may be configured to perform the corresponding operations in the method provided in the embodiments of this application. As shown in FIG. 12, a data processing apparatus 1200 may be configured for the computer device in the embodiment corresponding to FIG. 3. Specifically, the apparatus may include a data obtaining module 11, a sample matching module 12, and a model training module 13.

The data obtaining module 11 is configured to obtain a server side training sample corresponding to a client side training sample from candidate samples based on the client side training sample corresponding to a first participation device, the client side training sample having a first sample feature, and the server side training sample having a second sample feature.

The sample matching module 12 is configured to call a distance detection model to predict a sample distance between each of the candidate samples and the server side training sample, and obtain similar training samples from the candidate samples based on the sample distances.

The model training module 13 is configured to train an auxiliary model of a second participation device by using the server side training sample and the similar training samples, to obtain a trained auxiliary model, and transmit intermediate data generated during the training of the auxiliary model to the first participation device, the first participation device being configured to train a first model of the first participation device based on the client side training sample and the intermediate data, to obtain a trained first model.

The trained auxiliary model is configured to: predict, when the second participation device receives a data detection request for to-be-processed data transmitted by the first participation device, a second prediction result of associated data associated with the to-be-processed data, and transmit the second prediction result to the first participation device, the first participation device being configured to determine a target detection result of the to-be-processed data based on the second prediction result and a first prediction result obtained by the first participation device by predicting the to-be-processed data based on the trained first model.

For specific implementations and functions of the data obtaining module 11, the sample matching module 12, and the model training module 13, reference may be made to the foregoing method embodiments. Details are not described herein again.

Figure 13:
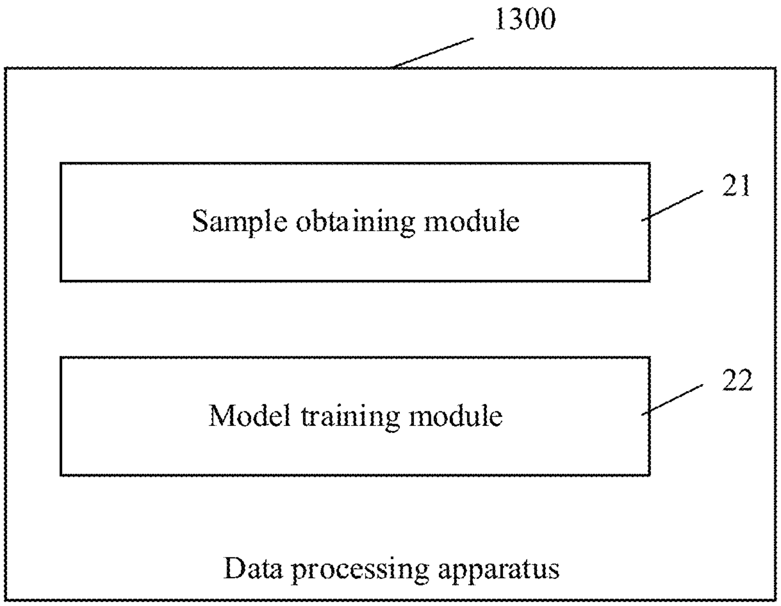
FIG. 13 is a schematic diagram of another data processing apparatus for a federated learning system according to an embodiment of this application.

Further, FIG. 13 is a schematic diagram of another data processing apparatus according to an embodiment of this application. The data processing apparatus may be a computer program (including program code, and the like) running in a computer device. For example, the data processing apparatus may be application software. The apparatus may be configured to perform the corresponding operations in the method provided in the embodiments of this application. As shown in FIG. 13, a data processing apparatus 1300 may be configured for the computer device in the embodiment corresponding to FIG. 6. Specifically, the apparatus may include a sample obtaining module 21 and a model training module 22.

The sample obtaining module 21 is configured to obtain a client side training sample.

The model training module 22 is configured to receive intermediate data generated during training of an auxiliary model of a second participation device and transmitted by the second participation device, and train a first model of a first participation device based on the client side training sample and the intermediate data, to obtain a trained first model.

The intermediate data is generated during the training of the auxiliary model of the second participation device by the second participation device by using the server side training sample and similar training samples. The server side training sample is obtained by the second participation device based on the client side training sample, and the similar training samples are obtained from candidate samples by the second participation device based on a sample distance between each of the candidate samples and the server side training sample.

The trained first model is configured to: predict a first prediction result of to-be-processed data; and obtain a second prediction result of associated data of the to-be-processed data transmitted by the second participation device, and obtain a target detection result of the to-be-processed data based on the first prediction result and a second prediction result.

For specific implementations and functions of the sample obtaining module 21 and the model training module 22, reference may be made to the foregoing method embodiments. Details are not described herein again. The embodiments of this application provide the data processing apparatus for a federated learning system. Data interaction, and the like between the first participation device and the second participation device is implemented through the foregoing two apparatuses, so that the second participation device may obtain a first sample feature configured for a target business need scenario based on a first training sample in the first participation device, and obtain a second training sample based on the first sample feature. The first participation device and the second participation device may implement combined training of the models based on respective samples thereof and the intermediate data transmitted by the other party, so as to implement sample enhancement and improve generalization of the models while maintaining data independence. In addition, since the first sample feature is obtained based on the first training sample, and the second training sample is obtained based on a sample distance from the first sample feature, the second training sample being applicable to the target business need scenario is implemented based on implementation of sample enhancement, thereby improving performance and accuracy of a model obtained through federated learning.

Figure 14:
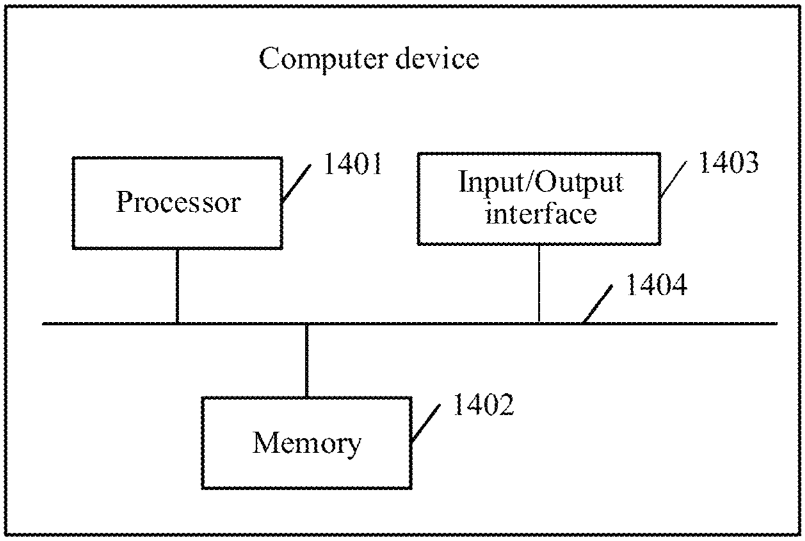
FIG. 14 is a schematic structural diagram of a computer device according to an embodiment of this application.

FIG. 14 is a schematic structural diagram of a computer device according to an embodiment of this application. As shown in FIG. 14, the computer device in this embodiment of this application may include one or more processors 1401, a memory 1402, and an input/output interface 1403. The processor 1401, the memory 1402, and the input/output interface 1403 are connected through a bus 1404. The memory 1402 is configured to store a computer program. The computer program includes a program instruction. The input/output interface 1403 is configured to receive data and output data, for example, configured to perform data interaction between a first participation device and a second participation device. The processor 1401 is configured to execute the program instruction stored in the memory 1402.

The processor 1401 is located in the second participation device, and may perform the following operations:

obtaining a server side training sample corresponding to a client side training sample from candidate samples based on the client side training sample of the first participation device, the client side training sample having a first sample feature, and the server side training sample having a second sample feature;

calling a distance detection model to predict a sample distance between each of the candidate samples and the server side training sample, and obtaining similar training samples from the candidate samples based on the sample distances, the sample distance being configured for representing a distribution similarity between the candidate sample and the server side training sample; and training an auxiliary model of the second participation device by using the server side training sample and the similar training samples, to obtain a trained auxiliary model, and transmitting intermediate data generated during the training of the auxiliary model to the first participation device, the first participation device being configured to train a first model of the first participation device based on the client side training sample and the intermediate data, to obtain a trained first model.

The trained auxiliary model is configured to: predict, when the second participation device receives a data detection request for to-be-processed data transmitted by the first participation device, a second prediction result of associated data associated with the to-be-processed data, and transmit the second prediction result to the first participation device, the first participation device being configured to determine a target detection result of the to-be-processed data based on the second prediction result and a first prediction result obtained by the first participation device by predicting the to-be-processed data based on the trained first model.

Alternatively, the processor 1401 is located in the first participation device, and may perform the following operations:

obtaining the client side training sample; and receiving intermediate data generated during training of an auxiliary model of the second participation device and transmitted by the second participation device, and training a first model of the first participation device based on the client side training sample and the intermediate data, to obtain a trained first model.

The intermediate data is generated during the training of the auxiliary model of the second participation device by the second participation device by using the server side training sample and similar training samples. The server side training sample is obtained by the second participation device based on the client side training sample, and the similar training samples are obtained from candidate samples by the second participation device based on a sample distance between each of the candidate samples and the server side training sample.

The trained first model is configured to: predict a first prediction result of to-be-processed data; and obtain a second prediction result of associated data of the to-be-processed data transmitted by the second participation device, and obtain a target detection result of the to-be-processed data based on the first prediction result and a second prediction result.

In some feasible implementations, the processor 1401 may be a central processing unit (CPU), or may be another general-purpose processor, a digital signal processor (DSP), an application specific integrated circuit (ASIC), a field-programmable gate array (FPGA) or another programmable logic device, a discrete gate or a transistor logic device, a discrete hardware component, or the like. The general-purpose processor may be a microprocessor, or the processor may also be any conventional processor, or the like.

The memory 1402 may include a read-only memory and a random access memory, and provide an instruction and data to the processor 1401 and the input/output interface 1403. A part of the memory 1402 may further include a non-volatile random access memory. For example, the memory 1402 may further store information about a device type.

In a specific implementation, the computer device may perform the implementations provided in the operations of FIG. 3 or FIG. 6 through built-in functional modules thereof. For details, reference may be made to the implementations provided in the operations of FIG. 3 or FIG. 6. Details are not described herein again.

An embodiment of this application provides a computer device, including a processor, an input/output interface, and a memory. The processor obtains a computer program in the memory, and performs the operations of the method shown in FIG. 3 to perform federated learning operations. In this embodiment of this application, the following operations are implemented: obtaining a first sample feature corresponding to a first training sample based on the first training sample corresponding to a first participation device; obtaining a sample distance between a candidate sample and the first sample feature, and obtaining a second training sample from the candidate samples based on the sample distance; and training a first model and a parsing model associated with the first model by using the first sample feature and the second training sample, to obtain a trained first model and a trained parsing model, and transmitting a first sample prediction result generated during the training of the first model and a sample parsing result generated during the training of the parsing model to a second participation device, so that the second participation device trains a second model based on the first training sample, the first sample prediction result, and the sample parsing result, to obtain a trained second model. The trained first model and the trained second model are configured to jointly predict to-be-processed data, to obtain a target detection result corresponding to the to-be-processed data. Through the foregoing process, the second participation device and the first participation device jointly implement federated learning, which may directly obtain the first sample feature corresponding to the first training sample of the first participation device. The first participation device may be considered as a modeling party (a guest side). In the manner, a sample configured for joint training with the first participation device is obtained. In addition, a second training sample may be obtained based on the sample distance, to expand a sample quantity and perform sample enhancement. In this way, sufficient samples may be provided for model training, overfitting of a model obtained through federated learning may be reduced, and generalization of the model may be improved. However, since the second training sample is obtained based on the sample distance from the first sample feature, the second training sample may be adapted to a business need scenario corresponding to the first training sample, thereby improving performance of the model obtained through the federated learning.

An embodiment of this application further provides a non-transitory computer-readable storage medium, having a computer program stored therein, the computer program being adapted to be loaded and executed by a processor, to implement the data processing method for a federated learning system provided in the operations of FIG. 3 or FIG. 6. For details, reference may be made to the implementations provided in the operations of FIG. 3 or FIG. 6. Details are not described herein again. In addition, for the description of the beneficial effects of using the same method, details are not described again. For technical details that are not disclosed in the embodiment of the computer-readable storage medium involved in this application, reference is made to the description of the method embodiment of this application. In an example, the computer program may be deployed to be executed on one computer device, or executed on a plurality of computer devices located at one location, or executed on a plurality of computer devices distributed at a plurality of locations and connected by a communication network.

The computer-readable storage medium may be the data processing apparatus for a federated learning system provided in any one of the foregoing embodiments or an internal storage unit of the computer device, for example, a hard disk or an internal memory of the computer device. The computer-readable storage medium may alternatively be an external storage device of the computer device, for example, a plug-in hard disk, a smart media card (SMC), a secure digital (SD) card, and a flash card equipped on the computer device. Further, the computer-readable storage medium may further include both the internal storage unit and the external storage device of the computer device. The computer-readable storage medium is configured to store the computer program and other programs and data required by the computer device. The computer-readable storage medium may further be configured to temporarily store data that has been outputted or that is to be outputted.

An embodiment of this application further provides a computer program product or a computer program, the computer program product or the computer program including a computer instruction, the computer instruction being stored in a computer-readable storage medium. A processor of a computer device is configured to read the computer instruction form the computer-readable storage medium. The processor is configured to execute the computer instruction, so that the computer device performs the method provided in the optional manners of FIG. 3 or FIG. 6. In this way, the following operations are implemented: the second participation device and the first participation device jointly implement federated learning, which may directly obtain the first sample feature corresponding to the first training sample of the first participation device. The first participation device may be considered as a modeling party (a guest side). In the manner, the sample configured for joint training with the first participation device is obtained. In addition, a second training sample may be obtained based on the sample distance, to expand a sample quantity and perform sample enhancement. In this way, sufficient samples may be provided for model training, overfitting of a model obtained through federated learning may be reduced, and generalization of the model may be improved. However, since the second training sample is obtained based on the sample distance from the first sample feature, the second training sample may be adapted to a business need scenario corresponding to the first training sample, thereby improving performance of the model obtained through the federated learning.

The terms "first," "second," and the like in the specification, the claims, and the accompanying drawings of the embodiments of this application are configured for distinguishing different objects, rather than being configured for describing a specific order. Moreover, the term "include" and any variation thereof are intended to cover non-exclusive inclusions. For example, processes, methods, apparatuses, products, or devices including a series of operations or units are not limited to the listed operations or modules, but instead, include operations or modules not listed in some embodiments, or include other operations or units inherent in these processes, methods, apparatuses, products, or devices in some embodiments.

A person of ordinary skill in the art may realize that operations of units and algorithms of various examples described with reference to the embodiments disclosed in this specification can be implemented in electronic hardware, computer software, or a combination of the electronic hardware and the computer software. To clearly describe the interchangeability of hardware and software, the compositions and operations of the various examples have been generally described in terms of functionality in the description. Whether the functions are performed by hardware or software depends on particular applications and design constraint conditions of the technical solutions. A person skilled in the art may use different methods to implement the described functions for each particular application, but it is not considered that such implementation goes beyond the scope of this application.

The method and the related apparatus provided in the embodiments of this application are described with reference to the method flowcharts and/or schematic structural diagrams provided in the embodiments of this application. Specifically, each process and/or block in the method flowchart and/or the schematic structural diagram and a combination of the process and/or the block in the flowchart and/or the block diagram may be implemented by a computer program instruction. These computer program instructions may be provided to a processor of a general-purpose computer, a special-purpose computer, an embedded processing machine, or another programmable federated learning device to generate a machine, so that instructions executed by a processor of the computer or the another programmable federated learning device generate an apparatus for implementing functions specified in one or more processes of the flowcharts and/or one or more blocks of the schematic structural diagrams. These computer program instructions may also be stored in a computer-readable memory that can direct a computer or another programmable federated learning device to operate in a specific manner, so that the instructions stored in the computer-readable memory produce a product including an instruction apparatus. The instruction apparatus implements the functions specified in one or more processes of the flowchart and/or one or more blocks of the schematic structural diagram. These computer program instructions may also be loaded onto a computer or another programmable federated learning device, so that a series of operations are performed on the computer or the another programmable device to generate a computer-implemented process. Therefore, the instructions executed on the computer or the another programmable device provide operations for implementing the functions specified in one or more processes of the flowchart and/or one or more blocks of the schematic structural diagram.

The operations of the method of the embodiments of this application may be reordered, merged, and deleted based on an actual need.

The modules of the apparatus of the embodiments of this application may be merged, divided, and deleted based on an actual need.

What is disclosed above is merely exemplary embodiments of this application, and certainly is not intended to limit the scope of the claims of this application. Therefore, equivalent variations made in accordance with the claims of this application still fall within the scope of this application.

What is claimed is:

1. A data processing method comprising:

obtaining a server side training sample corresponding to a client side training sample of a first participation device of a federated learning system from one or more candidate samples of a second participation device of the federated learning system, the client side training sample having a first sample feature, and the server side training sample having a second sample feature;

calling a distance detection model to predict one or more sample distances each between one of the one or more candidate samples and the server side training sample and representing a distribution similarity between the one of the one or more candidate samples and the server side training sample;

obtaining a similar training sample from the one or more candidate samples based on the one or more sample distances;

training an auxiliary model of the second participation device using the server side training sample and the similar training sample, to obtain a trained auxiliary model;

transmitting intermediate data generated during training of the auxiliary model to the first participation device, to enable the first participation device to train a model of the first participation device based on the client side training sample and the intermediate data, to obtain a trained model and to perform prediction on target data based on the trained model to obtain a first prediction result;

predicting, in response to receiving a data detection request for the target data transmitted by the first participation device, a second prediction result of associated data associated with the target data based on the trained auxiliary model; and transmitting the second prediction result to the first participation device, to enable the first participation device to determine a target detection result of the target data based on the second prediction result and the first prediction result.

2. The method according to claim 1, wherein obtaining the server side training sample includes:

obtaining first identifier ciphertext information of a first sample identifier corresponding to the client side training sample in the first participation device, the first sample identifier being a sample identifier of the client side training sample in the first participation device;

obtaining second identifier ciphertext information of one or more second sample identifiers each corresponding to one of the one or more candidate samples, the second sample identifier of one candidate sample being a sample identifier of the one candidate sample in the second participation device;

performing intersection parsing on the first identifier ciphertext information and the second identifier ciphertext information to determine a common sample identifier between the first sample identifier and the one or more second sample identifiers; and obtaining one of the one or more candidate samples that corresponds to the common sample identifier as the server side training sample.

3. The method according to claim 2, wherein obtaining the second identifier ciphertext information includes:

receiving a first device public key transmitted by the first participation device;

obtaining a sample quantity M of the one or more candidate samples, M being a positive integer;

generating M random numbers;

encrypting the M random numbers and a second sample identifier corresponding to each of the M candidate samples using the first device public key, to obtain initial candidate ciphertext for the M candidate samples;

transmitting the initial candidate ciphertext to the first participation device, so that the first participation device decrypts the initial candidate ciphertext to obtain the second identifier ciphertext information; and receiving the second identifier ciphertext information transmitted by the first participation device.

4. The method according to claim 3, wherein performing intersection parsing on the first identifier ciphertext information and the second identifier ciphertext information to determine the common sample identifier includes:

performing random number elimination on the second identifier ciphertext information using the M random numbers, to obtain third identifier ciphertext information;

performing intersection parsing on the third identifier ciphertext information and the first identifier ciphertext information, to obtain common identifier ciphertext information, the first identifier ciphertext information being obtained by the first participation device encrypting the first sample identifier using a first device private key corresponding to the first device public key;

transmitting the common identifier ciphertext information to the first participation device, so that the first participation device decrypts the common identifier ciphertext information using the first device private key to obtain the common sample identifier; and receiving the common sample identifier transmitted by the first participation device.

5. The method according to claim 1, wherein:

the distance detection model is trained based on a first distance sample, a second distance sample, and a distance label between the first distance sample and the second distance sample; and obtaining the similar training sample includes determining, as the similar training sample, one of the one or more candidate samples that corresponds to one of the one or more sample distances that satisfies a sample similarity condition.

6. The method according to claim 5, further comprising:

obtaining the first distance sample and the second distance sample;

obtaining a first data cluster to which the first distance sample belongs and a second data cluster to which the second distance sample belongs;

determining the distance label based on a cluster relationship between the first data cluster and the second data cluster, the cluster relationship including a first cluster relationship and a second cluster relationship, the first cluster relationship representing that the first data cluster and the second data cluster are a same data cluster, and the second cluster relationship representing that the first data cluster and the second data cluster are different data clusters;

calling an initial distance detection model to predict a predicted distance between the first distance sample and the second distance sample; and performing parameter adjustment on the initial distance detection model based on the predicted distance and the distance label, to obtain the distance detection model.

7. The method according to claim 1, wherein:

the model of the first participation device is a first model and the trained model is a first trained model;

the auxiliary model includes a second model and a parsing model; and training the auxiliary model includes:

obtaining a first sample prediction result obtained by the first participation device performing prediction for the client side training sample;

calling the second model to predict a second sample prediction result corresponding to the server side training sample;

calling the parsing model to predict a sample parsing result of the second sample prediction result corresponding to the server side training sample;

performing parameter adjustment on the parsing model based on prediction difference information between the sample parsing result and the first sample prediction result, to obtain a trained parsing model;

calling the second model to predict a second sample prediction result corresponding to the server side training sample and the similar training sample, and calling the trained parsing model to predict a sample parsing result of the second sample prediction result corresponding to the server side training sample and the similar training sample;

transmitting, to the first participation device, the second sample prediction result corresponding to the server side training sample and the similar training sample, and the sample parsing result predicted by the trained parsing model, so that the first participation device performs parameter adjustment on the first model based on the second sample prediction result corresponding to the server side training sample and the similar training sample, the sample parsing result predicted by the trained parsing model, and the client side training sample, to obtain the trained first model; and performing parameter adjustment on the second model based on intermediate data generated during parameter adjustment of the first model by the first participation device, to obtain a trained second model.

8. The method according to claim 7, wherein:

the intermediate data includes gradient update ciphertext; and performing parameter adjustment on the second model based on the intermediate data includes:

encrypting a model parameter of the second model using a first homomorphic key, to obtain parameter ciphertext;

performing ciphertext adjustment on the parameter ciphertext based on the gradient update ciphertext, to obtain updated parameter ciphertext;

decrypting the updated parameter ciphertext using a second homomorphic key corresponding to the first homomorphic key, to obtain an updated model parameter; and determining a second model including the updated model parameter as the trained second model in response to the updated model parameter satisfying a model convergence condition.

9. The method according to claim 1, wherein:

the model of the first participation device is a first model and the trained model is a first trained model;

the auxiliary model includes a second model and a parsing model; and training the auxiliary model includes:

in an $i^{th}$ round of model training, calling a second model (i−1) obtained in an $(i-1)^{th}$ round of model training to predict a second sample prediction result $$R_{si}^{com}$$

corresponding to the server side training sample, and calling a parsing model (i−1) obtained through the (i−1)$^{th}$ round of model training to predict a sample parsing result $$R'_{t(i-1)}$$

of the second sample prediction result $$R_{si}^{com},$$

i being a positive integer;

obtaining a first sample prediction result $R_{ti}$ obtained by the first participation device performing prediction for the client side training sample;

performing, based on prediction difference information between the sample parsing result $$R'_{t(i-1)}$$

and the first sample prediction result $R_{ti}$, parameter adjustment on the parsing model (i−1) obtained in the (i−1)$^{th}$ round of model training, to obtain a parsing model i for the i$^{th}$ round of model training;

calling the second model (i−1) obtained in the (i−1)$^{th}$ round of model training to predict a second sample prediction result $R_{si}$ corresponding to the server side training sample and the similar training sample;

calling the parsing model i obtained in the i$^{th}$ round of model training to predict a sample parsing result $$R'_{ti}$$

of the second sample prediction result $R_{si}$;

transmitting the second sample prediction result $R_{si}$ and the sample parsing result $$R'_{ti}$$

to the first participation device, so that the first participation device performs parameter adjustment on a first model (i−1) of the first participation device based on the second sample prediction result $R_{si}$, the sample parsing result $$R'_{ti},$$

and the client side training sample, to obtain a first model i for the i$^{th}$ round of model training;

performing parameter adjustment on the second model (i−1) based on intermediate data i generated during the parameter adjustment of the first model (i−1) by the first participation device, to obtain a second model i; and determining the second model i obtained in the i$^{th}$ round of model training as a trained second model, and determining the parsing model i obtained in the i$^{th}$ round of model training as a trained parsing model in response to parameters of the parsing model i and the second model i converging.

10. The method according to claim 1, further comprising:

receiving the data detection request for the target data transmitted by the first participation device, and obtaining the associated data associated with the target data;

calling a trained model to predict the second prediction result of the associated data; and transmitting the second prediction result to the first participation device, so that the first participation device determines the target detection result corresponding to the target data based on the second prediction result and the first prediction result corresponding to the target data.

11. One or more non-transitory computer-readable storage media storing one or more instructions that, when executed by one or more processors, cause the one or more processors to perform the method according to claim 1.

12. A computer device comprising:

one or more processors; and one or more memories storing one or more instructions that, when executed by the one or more processors, cause the computer device to:

obtain a server side training sample corresponding to a client side training sample of a first participation device of a federated learning system from one or more candidate samples of a second participation device of the federated learning system, the computer device being the second participation device, the client side training sample having a first sample feature, and the server side training sample having a second sample feature;

call a distance detection model to predict one or more sample distances each between one of the one or more candidate samples and the server side training sample that represents a distribution similarity between the one of the one or more candidate samples and the server side training sample;

obtain a similar training sample from the one or more candidate samples based on the one or more sample distances;

train an auxiliary model of the second participation device using the server side training sample and the similar training sample, to obtain a trained auxiliary model; and transmit intermediate data generated during training of the auxiliary model to the first participation device, to enable the first participation device to train a model of the first participation device based on the client side training sample and the intermediate data, to obtain a trained model and to perform prediction on target data based on the trained model to obtain a first prediction result;

predict, in response to receiving a data detection request for the target data transmitted by the first participation device, a second prediction result of associated data associated with the target data based on the trained auxiliary model; and transmit the second prediction result to the first participation device, to enable the first participation device to determine a target detection result of the target data based on the second prediction result and the first prediction result.

13. The computer device according to claim 12, wherein the one or more instructions, when executed by the one or more processors, further cause the computer device to:

obtain first identifier ciphertext information of a first sample identifier corresponding to the client side training sample in the first participation device, the first sample identifier being a sample identifier of the client side training sample in the first participation device;

obtain second identifier ciphertext information of one or more second sample identifiers each corresponding to one of the one or more candidate samples, the second sample identifier of one candidate sample being a sample identifier of the one candidate sample in the second participation device;

perform intersection parsing on the first identifier ciphertext information and the second identifier ciphertext information to determine a common sample identifier between the first sample identifier and the one or more second sample identifiers; and obtain one of the one or more candidate samples that corresponds to the common sample identifier as the server side training sample.

14. The computer device according to claim 13, wherein the one or more instructions, when executed by the one or more processors, further cause the computer device to:

receive a first device public key transmitted by the first participation device;

obtain a sample quantity M of the one or more candidate samples, M being a positive integer;

generate M random numbers;

encrypt the M random numbers and a second sample identifier corresponding to each of the M candidate samples using the first device public key, to obtain initial candidate ciphertext for the M candidate samples;

transmit the initial candidate ciphertext to the first participation device, so that the first participation device decrypts the initial candidate ciphertext to obtain the second identifier ciphertext information; and receive the second identifier ciphertext information transmitted by the first participation device.

15. A data processing method comprising:

obtaining a client side training sample of a first participation device of a federated learning system;

receiving intermediate data generated during training of an auxiliary model of a second participation device of the federated learning system and transmitted by the second participation device;

training a model of the first participation device based on the client side training sample and the intermediate data, to obtain a trained model;

predicting a first prediction result of target data based on the trained model;

obtaining a second prediction result of associated data of the target data transmitted by the second participation device; and obtaining a target detection result of the target data based on the first prediction result and the second prediction result;

wherein:

the auxiliary model is trained by the second participation device using a server side training sample and a similar training sample;

the server side training sample is obtained by the second participation device based on the client side training sample; and the similar training sample is obtained from one or more candidate samples by the second participation device based on one or more sample distances each between one of the one or more candidate samples and the server side training sample.

16. The method according to claim 15, wherein the model includes a detection network and a classifier network, the model of the first participation device is a first model, and the auxiliary model includes a second model and a parsing model;

the method further comprising:

calling the detection network to predict a first sample prediction result of the client side training sample; and transmitting the first sample prediction result to the second participation device, so that the second participation device performs parameter adjustment on the parsing model based on prediction difference information between the first sample prediction result and a sample parsing result included in the intermediate data, to obtain a trained parsing model, the intermediate data further including a second sample prediction result;

wherein receiving the intermediate data and training the first model include:

receiving the second sample prediction result and the sample parsing result generated during the training of the auxiliary model and transmitted by the second participation device;

calling the classifier network to predict a sample detection result corresponding to the first sample prediction result, the second sample prediction result, and the sample parsing result;

obtaining a sample label corresponding to the sample detection result; and performing parameter adjustment on the first model based on result deviation data between the sample detection result and the sample label, to obtain the trained model.

17. The method according to claim 16, wherein:

calling the detection network to predict the first sample prediction result and transmitting the first sample prediction result to the second participation device include:

calling, in an $i^{th}$ round of model training, a detection network (i−1) obtained in an $(i-1)^{th}$ round of model training to predict a first sample prediction result $R_{ti}$ of the client side training sample, i being a positive integer; and transmitting the first sample prediction result $R_{ti}$ to the second participation device, so that the second participation device performs parameter adjustment on a parsing model (i−1) obtained in the $(i-1)^{th}$ round of model training based on prediction difference information between the first sample prediction result $R_{ti}$ and a sample parsing result $$R'_{t(i-1)},$$

the sample parsing result $$R'_{t(i-1)}$$

being predicted by the second participation device by calling the parsing model (i−1) obtained in the (i−1)$^{th}$ round of model training;

receiving the second sample prediction result and the sample parsing result includes:

obtaining a second sample prediction result $R_{si}$ and a sample parsing result $$R'_{ti}$$

transmitted by the second participation device, the second sample prediction result $R_{si}$ being predicted by the second participation device for the server side training sample and the similar training sample in a second model (i−1) obtained in the (i−1)$^{th}$ round of model training, the sample parsing result $$R'_{ti}$$

being predicted by the second participation device for the second sample prediction result $R_{si}$ through a parsing model i obtained in an i$^{th}$ round of model training, and the second sample prediction result $R_{si}$ including a second sample prediction result $$R_{si}^{com}$$

of the server side training sample and a second sample prediction result $$R_{si}^{miss}$$

of the similar training sample;

calling the classifier network to predict the sample detection result includes:

calling a classifier network (i−1) obtained in the (i−1)$^{th}$ round of model training to predict a first sample detection result $$Y'_{ti}$$

corresponding to the sample prediction result $$R_{si}^{com}$$

of the server side training sample and the first sample prediction result $R_{ti}$; and predicting a second sample detection result $$Y'_{si}$$

corresponding to the sample parsing result $$R'_{ti}$$

and the sample prediction result $$R_{si}^{miss}$$

of the similar training sample; and performing parameter adjustment on the first model include performing parameter adjustment on a first model (i−1) based on the first sample detection result $$Y'_{ti},$$

a first sample label, the second sample detection result $$Y'_{si},$$

and a second sample label, to obtain a first model i for an i$^{th}$ round of model training; and determining the first model i as the trained model in response to a parameter of the first model i converging.

18. The method according to claim 15, wherein the model of the first participation device includes a detection network and a classifier network;

the method further comprising:

transmitting, in response to a data detection request for the target data, the data detection request to the second participation device, so that the second participation device obtains the associated data associated with the target data based on the data detection request;

obtaining the second prediction result transmitted by the second participation device;

calling the detection network to predict the first prediction result of the target data, the second prediction result being predicted by the second participation device for the associated data; and calling the classifier network to predict a target detection result corresponding to the first prediction result and the second prediction result.

19. One or more non-transitory computer-readable storage media storing one or more instructions that, when executed by one or more processors, cause the one or more processors to perform the method according to claim 15.

20. A computer device comprising:

one or more processors; and one or more memories storing one or more instructions that, when executed by the one or more processors, cause the computer device to perform the method according to claim 15;

wherein the computer device is the first participation device in the federated prediction system.

* * * * *